(12) United States Patent
Kageyama et al.

(10) Patent No.: US 7,092,117 B2
(45) Date of Patent: Aug. 15, 2006

(54) PRINT SYSTEM

(75) Inventors: Seiji Kageyama, Ibaraki (JP); Tatsuro Akabane, Ibaraki (JP); Takeshi Yamaguchi, Ibaraki (JP); Katsumi Kumagai, Ibaraki (JP)

(73) Assignee: Ricoh Printing Systems, Ltd., Tokyo (JP)

( * ) Notice: Subject to any disclaimer, the term of this patent is extended or adjusted under 35 U.S.C. 154(b) by 809 days.

(21) Appl. No.: 09/903,684

(22) Filed: Jul. 13, 2001

(65) Prior Publication Data

US 2002/0054351 A1 May 9, 2002

(30) Foreign Application Priority Data

Jul. 14, 2000 (JP) .......................... P2000-214031

(51) Int. Cl.
*G06F 15/00* (2006.01)
(52) U.S. Cl. .................... 358/1.18; 358/403; 358/1.15; 358/1.16

(58) Field of Classification Search ...... 358/1.15–1.17, 358/403, 1.18; 382/306; 715/500; 235/375
See application file for complete search history.

(56) References Cited

U.S. PATENT DOCUMENTS 6,631,495 B1 * 10/2003 Kato et al. .................. 715/500
6,867,874 B1 * 3/2005 Shima ....................... 358/1.15

* cited by examiner

*Primary Examiner*—Twyler M. Lamb
(74) *Attorney, Agent, or Firm*—McGinn IP Law Group, PLLC

(57) ABSTRACT

In a print system comprising a computer and a printer connected directly or indirectly via a network to the computer, the printer stores documents prepared by the computer, has a page/document layout processing section for the stored documents, and can output document data undergoing page/document layout, provided by the page/document layout processing section.

20 Claims, 22 Drawing Sheets

FIG. 10

ARCHIVE MANAGEMENT PAGE (NO. 1)

HOME | ARCHIVER | MANAGER

FOLDER TOOL MENU ▼

```
C:¥
├ f1
│  ├ f1_a
│  └ f1_b
├ f2
│  └ f2_a
└ f3
```

DOCUMENT TOOL MENU ▼   CHANGE THE DOCUMENT

OPENED FOLDER: C:¥

| | NAME | EDIT | PRINT | SIZE | REGISTER (DATE) | LAST USER (DATE) |
|---|---|---|---|---|---|---|
| ○ | f1 | ○ | | 1KB | k135473 (2000/06/05 09:45) | k132271 (2000/06/05 09:45) |
| ○ | f2 | ○ | ◎ | 1239KB | k135473 (1998/06/05 11:21) | k132271 (1998/06/05 11:21) |
| ○ | f3 | ○ | ○ | 11KB | k114948 (1998/06/05 11:21) | k132271 (1998/06/05 11:21) |
| ○ | f4 | ○ | ◎ | 1239KB | k135473 (2000/06/05 11:21) | k132271 (2000/06/05 11:21) |
| | | ○ | ◎ | 1KB | k135473 (2000/06/05 09:45) | k132271 (2000/06/05 09:45) |
| | | | | 1239KB | k135473 (2000/06/05 11:21) | k132271 (2000/06/05 11:21) |

FIG. 11

ARCHIVE MANAGEMENT PAGE (NO. 2)

PROCESSING CONCERNING FOLDERS

HOME | ARCHIVER | MANAGER

FOLDER TOOL MENU ▼

FOLDER TOOL MENU
NEW...
DELETE...
SAVE AS...
SHIFT...
COPY...
UPDATE

📁 f2_a
📁 f3

DOCUMENT TOOL MENU ▼   CHANGE THE DOCUMENT

OPENED FOLDER: C:¥

| NAME | EDIT | PRINT | SIZE | REGISTER (DATE) | LAST USER (DATE) |
|---|---|---|---|---|---|
| 📄 f1 | ○ |  | 1KB | k135473 (2000/06/05 09:45) | k132271 (2000/06/05 09:45) |
| 📄 f2 |  | ◎ | 1239KB | k135473 (1998/06/05 11:21) | k132271 (1998/06/05 11:21) |
| 📄 f3 |  | ○ | 11KB | k114948 (1998/06/05 11:21) | k132271 (1998/06/05 11:21) |
| 📄 f4 | ○ | ◎ | 1239KB | k135473 (2000/06/05 11:21) | k132271 (2000/06/05 11:21) |
|  |  |  | 1KB | k135473 (2000/06/05 09:45) | k132271 (2000/06/05 09:45) |
|  |  | ◎ | 1239KB | k135473 (2000/06/05 11:21) | k132271 (2000/06/05 11:21) |

FIG. 12

ARCHIVE MANAGEMENT PAGE (NO. 3)   PROCESSING CONCERNING DOCUMENTS

HOME | ARCHIVER | MANAGER

FOLDER TOOL MENU ▼

DOCUMENT TOOL MENU ▼

DOCUMENT TOOL MENU
PRINT...
ARCHIVE...
ARCHIVE AND PRINT...
DELETE...
SAVE AS...
DISPLAY...
SHIFT...
COPY...
RETRIEVE...
UPDATE

CHANGE THE DOCUMENT

| T | SIZE | REGISTER (DATE) | LAST USER (DATE) |
|---|---|---|---|
| | 1KB | k135473 (2000/06/05 09:45) | k132271 (2000/06/05 09:45) |
| | 1239KB | k135473 (1998/06/05 11:21) | k132271 (1998/06/05 11:21) |
| | 11KB | k114948 (1998/06/05 11:21) | k132271 (1998/06/05 11:21) |
| | 1239KB | k135473 (2000/06/05 11:21) | k132271 (2000/06/05 11:21) |
| | 1KB | k135473 (2000/06/05 09:45) | k132271 (2000/06/05 09:45) |
| | 1239KB | k135473 (2000/06/05 11:21) | k132271 (2000/06/05 11:21) |

● MANAGER (NO. 1)

HOME | ARCHIVER | MANAGER | ADMIN

SELECT MENU AFTER SELECT THE JOB, CONCERNING PRINT-JOB.

| PRINTER MENU ▼ | | PRINT-JOB MENU ▼ | | HELP! |

PRINTER: PRINTER (JOB NUMBERS: 3)

| PRINT JOB | STATUS | USER | PRIORITY | NUMBER OF PAGES | SIZE | RECEPTION TIME |
|---|---|---|---|---|---|---|
| ☐ aaa | RESERVATION | Administrator | 1 | 0 | 1,110 | 17:43 |
| ☐ bbb | RESERVATION | kuma | 2 | 2 | 200 | 17:44 |
| ☐ ccc | RESERVATION | aka | 2 | 2 | 200 | 17:45 |

FIG. 18
DOUBLE-SIDED PRINTING
SINGLE-SIDED ORIGINAL IS PRINTED ON BOTH SIDES OF SHEET
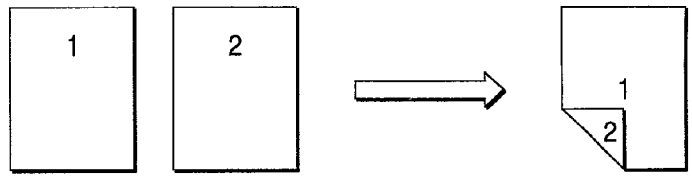
BINDING POSITION
PAPER IS BOUND IN EITHER OF THE FOLLOWING TWO DIRECTIONS:
LONG-SIDE BINDING     SHORT-SIDE BINDING
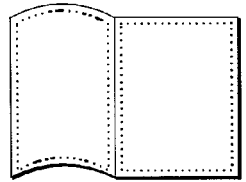    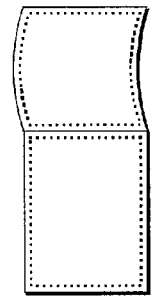

ONE PAGE OF ORIGINAL IS PUT ON ONE SIDE OF SHEET

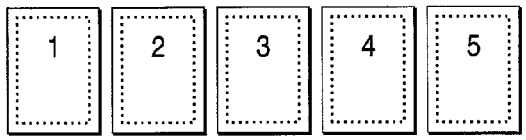

(b) 2 UP

TWO PAGES OF ORIGINAL ARE PUT ON ONE SIDE OF SHEET TOGETHER IN ANY OF THE FOLLOWING THREE MANNERS:

LEFT TO RIGHT   RIGHT TO LEFT   TOP TO BOTTOM

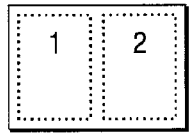 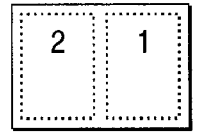 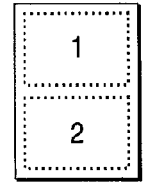

(c) 4 UP

FOUR PAGES OF ORIGINAL ARE PUT ON ONE SIDE OF SHEET TOGETHER IN ANY OF THE FOLLOWING FOUR MANNERS:

LEFT TO RIGHT   RIGHT TO LEFT   LEFT TO BOTTOM   RIGHT TO BOTTOM

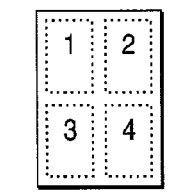 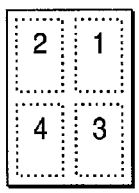 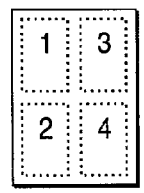 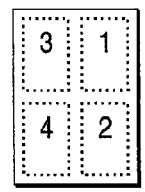

SADDLE STITCH

PAGES ARE TURNED IN ANY OF THE FOLLOWING THREE MANNERS:

LEFT OPEN   RIGHT OPEN   UPWARD OPEN

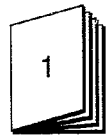 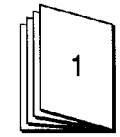 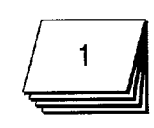

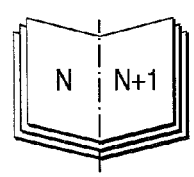 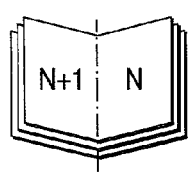 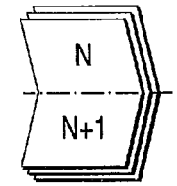

PRINT SYSTEM

BACKGROUND OF THE INVENTION

1. Field of the Invention

This invention relates to a print system consisting of a computer such as a personal computer or a workstation and a printer.

2. Description of the Related Art

Japanese Application No. Hei 09-54212 is named as an example of a related art of a print system. In the related art, documents are stored in the print system and an edit function of taking notes, adding check marks, etc., is provided for the stored documents.

However, the print system in the related art does not provide any page/document layout (n up, saddle stitch, dual page print such as a covered binding, etc.,) function for stored documents for the user. Therefore, before storing print data in the print system, the user needs to previously perform page/document layout and create print data with the page/document layout performed. In such a print system, processing of page/document layout, etc., takes time and labor and efficiency of reprinting involves a problem.

SUMMARY OF THE INVENTION

It is therefore an object of the invention to provide a print system having a page/document layout function for a stored document for improving the convenience and ease of use of the print system.

To the end, the invention adopts the following means:

According to a first aspect of the invention, there is provided a print system comprising a computer and a printer connected directly or indirectly via a network to the computer, characterized in that the printer stores documents prepared by the computer, has a page/document layout processing section for the stored documents, and outputs document data undergoing page/document layout, provided by the page/document layout processing section.

According to a second aspect of the invention, the user selects and specifies print, storage, or storage and print from the computer as an output destination of the document data undergoing the page/document layout and the printer executes print, storage, or print and storage as specified by the user.

BRIEF DESCRIPTION OF THE DRAWINGS

In the accompanying drawings:

FIG. 10 is a drawing to describe user interface of the computer in the invention;

FIG. 11 is a drawing to describe user interface of the computer in the invention;

FIG. 12 is a drawing to describe user interface of the computer in the invention;

FIG. 13 is a drawing to describe user interface of the computer in the invention;

FIG. 18 is a drawing to describe page/document layout processing in the invention;

FIG. 19 is a drawing to describe page/document layout processing in the invention;

DETAILED DESCRIPTION OF THE PREFERRED EMBODIMENTS

Figure 1:
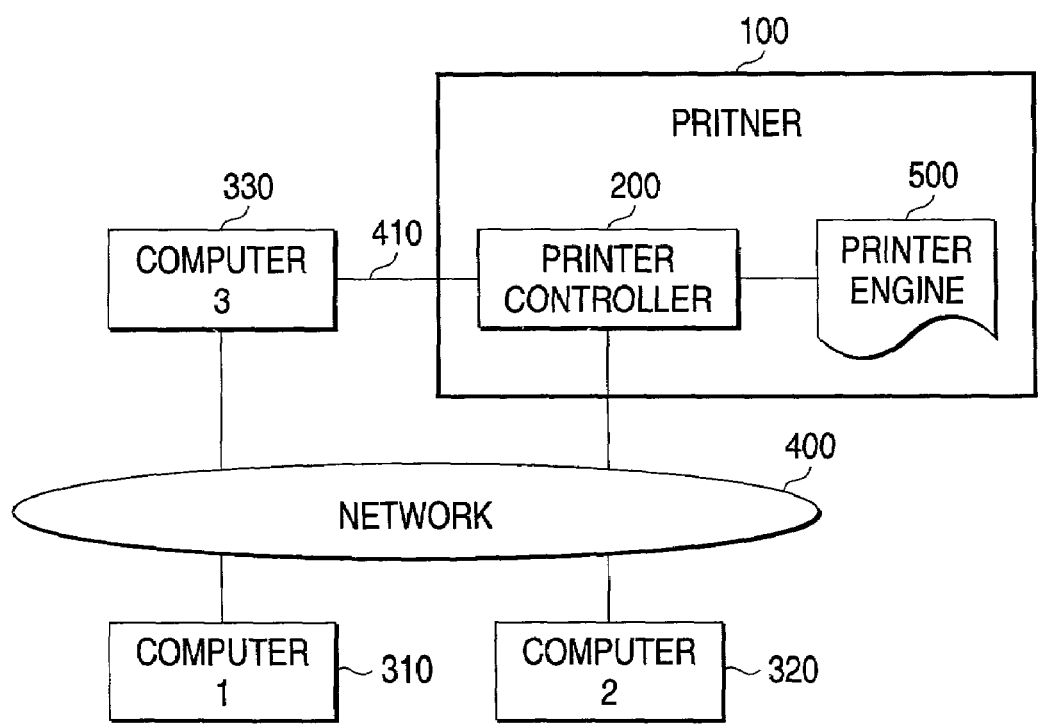
FIG. 1 is a block diagram of a printer and a print system according to the invention.

Referring now to the accompanying drawings, there are shown preferred embodiments of the invention. First, the general configuration of a print system of the invention will be discussed with reference to FIG. 1.

The print system comprises a network 400, a first computer 310, a second computer 320, a third computer 330, and a printer 100. The computers 310, 320, and 330 and the printer 100 are connected to the network 400.

The printer 100 is made up of a printer controller 200 and a printer engine 500. The printer controller 200 receives a print command sequence called a PDL document from the computer 310, 320, or 330 and performs a series of print processing and then transmits dot image data to the printer engine 500. The printer engine 500 receives the dot image data and uses a printer mechanism to perform physical printing on paper. Any of various methods of electrophotography using a laser optical system, electrophotography using LED, electrophotography using an electronic shutter, ink jet, shuttle-type impact, etc., can be used as the printer mechanism.

In the description that follows, an electrophotographic page printer is taken as an example. The invention can also be embodied if any other type of printer such as ink jet is used as the mechanism or if a line printer for printing in line units is used.

The computers 310, 320, and 330 are machines for requesting the printer to perform processing of printing, storing, etc., of documents and are also called clients. Hereinafter, the names of clients will also be used together with the computers.

The printer 100 receives the above-mentioned PDL document from the computer 310, 320, or 330 and prints, etc., for the PDL document as instructed by the computer. This topic will be discussed in detail later.

Next, the configuration of the computer 310, 320, 330 will be discussed with reference to FIG. 3. The computers 310, 320, and 330 all adopt the configuration shown in FIG. 3. A computer 300 comprises a first communication section 3110, a first OS kernel section 3120, a printer logical driver section 3130, an application program section 3140, a spool control instruction section 3160, an archive management instruction section 3170, and a printer configuration management instruction section 3180.

The first communication section 3110 is made up of hardware and software for the computer 300 to communicate with various machines on the network 400 (computers, printers, scanners, etc.,). Scanners are not shown. The first OS kernel section 3120 is basic software (also called operating system) for controlling hardware, a user interface, etc., implementing the computer 300. The first communication section 3110 can also be regarded as a part of the first OS kernel section 3120, but is described as a separate component to clarify the point.

The application program section 3140 provides programs for performing wordprocessing, spreadsheet, graphics document preparation, image document preparation, page/document layout, etc. It prepares various documents and instructs the printer logical driver section 3130 to process the prepared document.

The printer logical driver section 3130 converts the document prepared by the application program section 3140 into a format in which the printer controller 200 can accept and print the document, such as a printer command sequence or a page description language (the format will be hereinafter referred to as PDL format), and then outputs the provided PDL-format document (simply, PDL document) to (a) a user file in the computer 300 or (b) the printer controller 200.

In (a), a secondary storage unit 832 (HD, FD, MO, CD-ROM, CD-R, CD-RW, DVD-ROM, DVD-RAM, etc.,) of the computer 300 can be used as the user file. The user can register the PDL document in the user file in an archive 2200 of the printer controller 200 as described later.

In (b), the computer 300 transmits the PDL document to the printer controller 200 through the first OS kernel section 3120 and the first communication section 3110. The computer 300 and the printer controller 200 are connected using a printer local I/F 410 or the network 400. The same basic function is provided if they are connected using either of them.

PostScript (registered trademark) and PDF (Portable Document Format (registered trademark)) of Adobe, PCL-5, PCL-5E, PCL-6, PCL-XL (registered trademark) of Hewlett Packard, and the like are available, for example, as the PDL format. In the invention, any desired one or more of the PDL formats can be supported.

The spool control instruction section 3160 is used for the computer 300 to instruct a spool control service section 2110 in the printer controller 200 to control the print wait order, state reference of presence or absence of failure occurrence, the failure contents, etc., order change, deletion, etc., for print jobs stored in spool. FIG. 13 shows an outline of the user interface for providing the described function. The spool and print jobs will be discussed later with reference to FIG. 6.

The archive management instruction section 3170 is used for the computer 300 to instruct an archive management service section 2230 in the printer controller 200 to (1) list, delete, store, print, display/edit, etc., the documents stored therein and (2) control the folder configuration in the archive 2200.

The folders are small-capacity vessels into which the whole archive 2200 is divided, and are placed in a hierarchical structure. The documents are distributed among the folders for storage. The folders enable the user to sort and store a large amount of documents. To search the archive for a specific document, the user can efficiently find the document because the documents are distributed among the folders for storage.

In the control of the folder configuration, folder creation, deletion, folder name change, and the like are performed. FIGS. 10, 11, and 12 show an outline of the user interface for providing the described function. FIG. 10 shows an example of the folders in the hierarchical structure.

The printer configuration management instruction section 3180 is used for the computer 300 to instruct a printer configuration management service section 2000 in the printer controller 200 to set the configuration of the printer 100, reference printer statistical information, etc.

Figure 9:
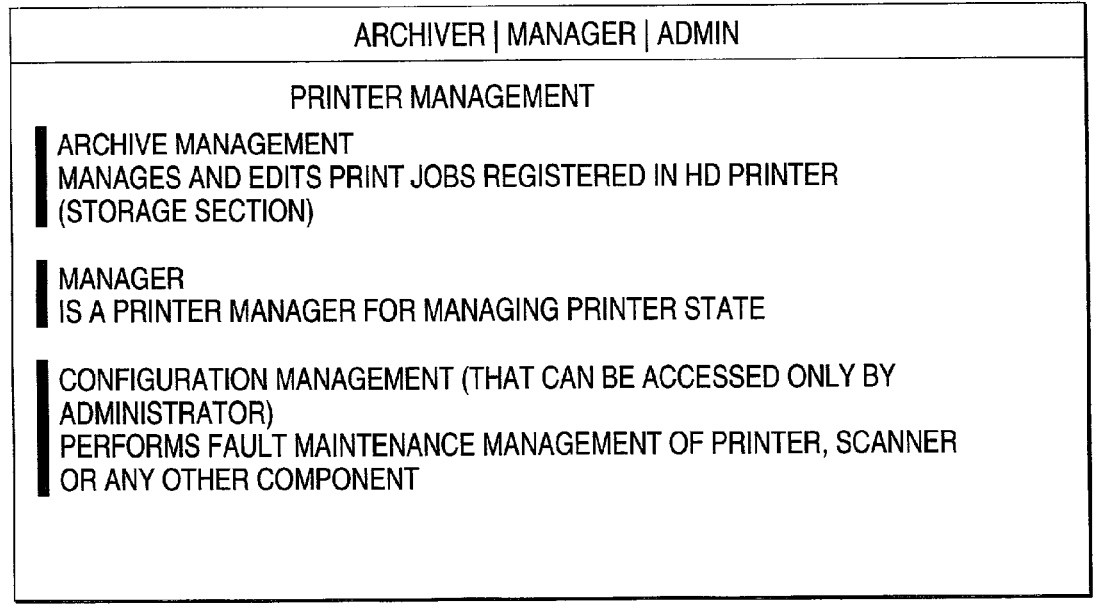
FIG. 9 is a drawing to describe user interface of the computer in the invention.

FIG. 9 shows the general configuration of the user interface in the computer 300 described above.

Figure 16:
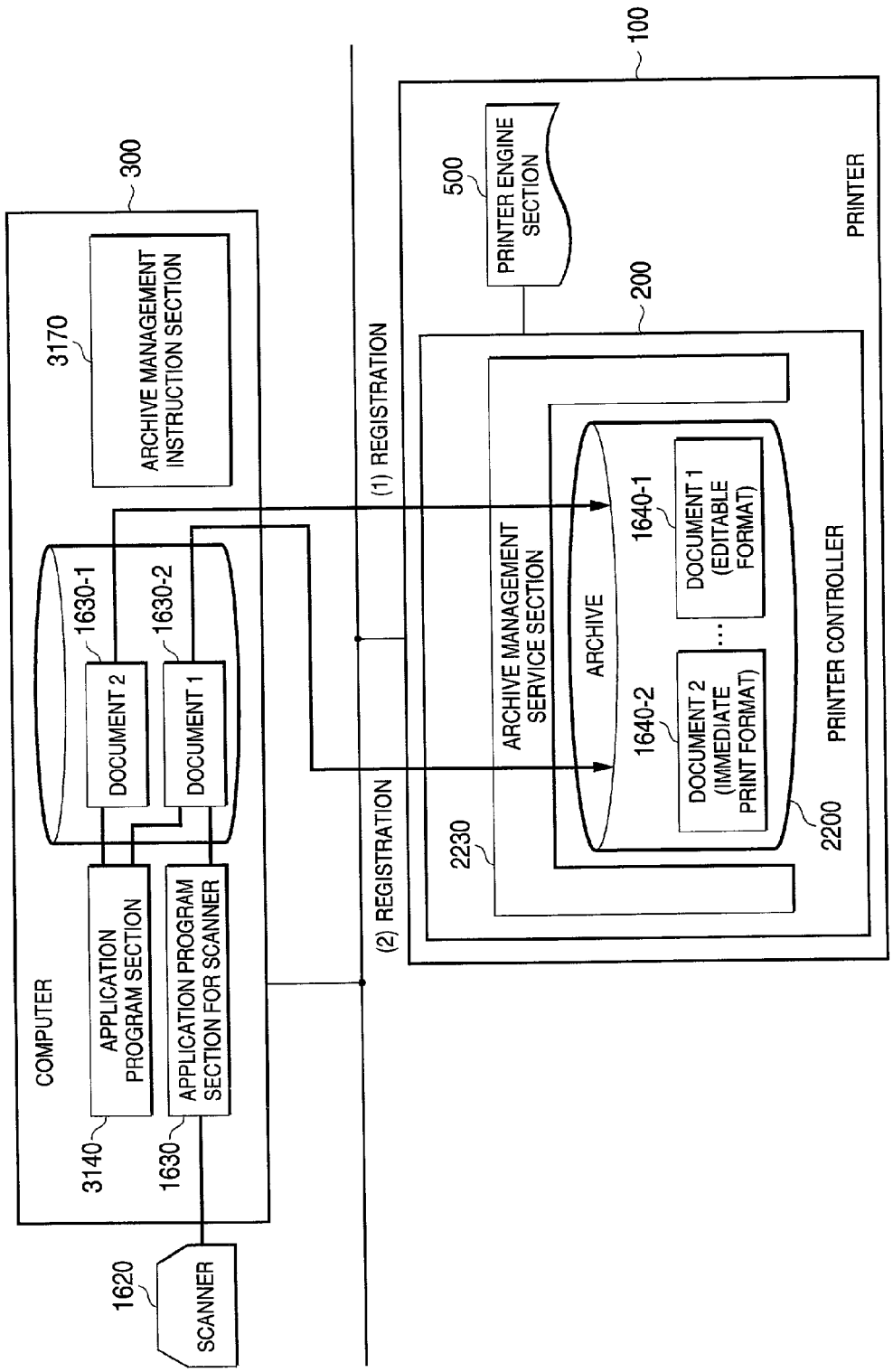
FIG. 16 is a block diagram to describe registration of documents in an archive in the invention.

Next, a registration procedure of documents in the archive 2200 on the computer 300 and a use method of the registered documents will be discussed with reference to FIGS. 16, 5, and 17.

First, the registration procedure of a user-prepared document in the archive 2200 will be discussed with reference to FIG. 16. The user prepares a PDL-format document 1630-1 or a dot-image-format document 1630-2. Using a registration function in the archive management instruction section 3170 in the client 300, the user instructs the archive management service section 2230 to register the document in the archive 2200. As instructed by the user, the archive management service section 2230 receives the PDL-format document 1630-1 or the dot-image-format document 1630-2 from the computer 300 and stores the received document in the archive 2200 in the printer controller 200. The PDL-format document 1630-1 is stored as an editable-format document 1640-1 and the dot-image-format document 1630-2 is stored as an immediate-print-format document 1640-2.

The PDL-format document 1630-1 is a document described in the PDL format mentioned above and is provided as a document in a PostScript format or a document in a PDF format, for example. To prepare the document in the PostScript format, a document in the format for the application program section 3140 can be input to the printer logical driver section 3130 for converting the document into the PostScript format, and the document in the PostScript format can be prepared as an output file.

A document file in the PostScript format is converted by a program called Distiller of Adobe or the like and the document in the PDF format is prepared as an output file.

Image data on paper is read through a scanner 1620 and the read output data is input to a scanner application program section 1630 and the dot-image-format document 1630-2 is prepared as an output file. TIFF (Tag Image File Format) or JPEG (Joint Photographic Experts Group) is used as the format of the file. As another method of preparing the dot-image-format document, the application program section 3140 having an image input function controls an image data input machine such as a scanner or a digital camera, whereby image data, etc., on paper is input and a file in the file format of TIFF, JPEG, etc., is output.

The user thus registers his or her prepared PDL-format or dot-image-format document in the archive 2200 in the printer controller 200. At this time, the user can register any document stored in the secondary storage unit 832 (HD, FD, MO, CD-ROM, CD-R, CD-RW, DVD-ROM, DVD-RAM, etc.,) of the computer 300.

The archive 2200 will be discussed with reference to FIG. 5. The archive 2200 is made up of a stored document group 2210 and an archive management file 2220. The stored document group 2210 is the actual storage contents of the documents and each document can be stored in the editable format (corresponding to the PDL format) or the immediate-print format (corresponding to the dot image format) or in combination as desired; specifically, each document is stored in (a) both the editable format and the immediate-print format, (b) only the editable format, or (c) only the immediate-print format.

Figure 5:
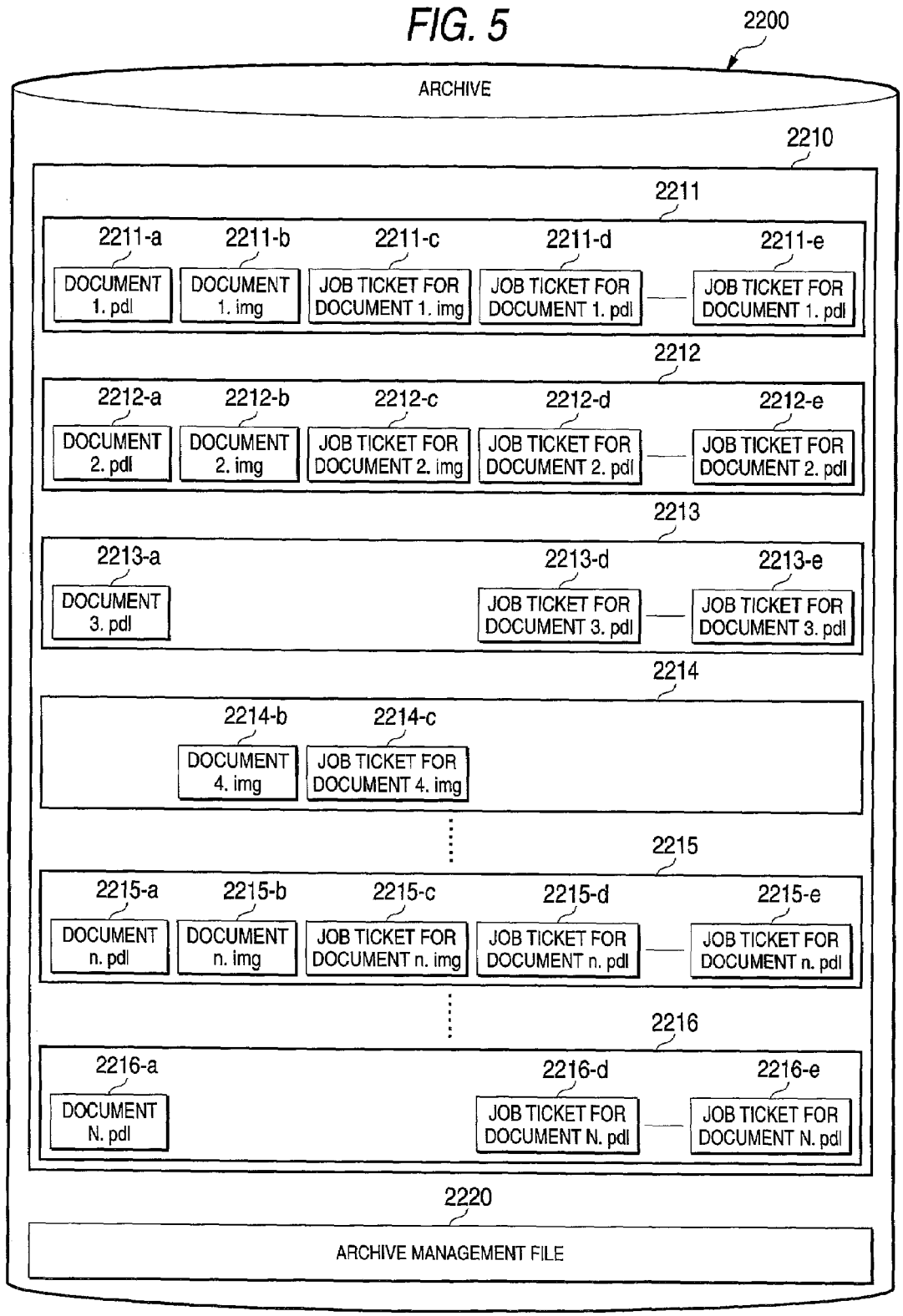
FIG. 5 is a block diagram to describe an archive of the printer controller in the invention.

In FIG. 5, a document 1 is stored in both the editable format 2211-*a* and the immediate-print format 2211-*b*. Likewise, documents 2 and n are stored in both the formats (2212-*a*, 2212-*b*, 2215-*a*, and 2215-*b*). Documents 3 and N are stored in only the editable format (2213-*a* and 2216-*a*). A document 4 is stored in only the immediate-print format (2214-*b*).

For each document i (i=1, 2, . . . , n, . . . , N), a job ticket is also stored in the archive 2200. For example, for the document 1 (2211-*a*), a job ticket 2211-*c* for the immediate-print format and job tickets 2211-*d*, . . . , 2211-*e* for the editable format are stored. In the embodiment, one document file and one job ticket for the immediate-print format; one document file and a plurality of job tickets for the editable format are stored (single immediate-print-format document and job ticket method); however, the invention can also be embodied if a plurality of document files and job tickets for the immediate-print format are stored. In this case, a plurality of immediate-print-format document files corresponding to the page/document layout specifications described in each of a plurality of job tickets for immediate-print-format documents are stored in the archive. This method of storing a plurality of document files and job tickets for the immediate-print format will be hereinafter called multiple immediate-print-format document and job ticket method.

The archive management file 2220 is a management file for conducting storage management of the stored document group 2210 and speeding up the operation of the stored document group 2210.

In addition to the archive management file 2220, an archive management table 2240 having the same contents as the archive management file 2220 in memory is also provided, whereby the access performance of the archive management service section 2230 to the archive 2200, specifically the stored document group 2210 is improved drastically.

Next, an automatic page/document layout method of a document registered in the archive 2200 will be discussed with reference to FIG. 17. The automatic page/document layout is as follows: If the user enters a parameter called a job ticket to give a page/document layout instruction for any document registered in the archive 2200 using the archive management instruction section 3170 (1710), the printer controller 200 automatically executes page/document layout. In response to the instruction 1710, an automatic page/document layout section 2810 in the printer controller 200 executes page/document layout processing.

The automatic page/document layout section 2810 inputs an editable-format document or an immediate-print-format document in the archive 2200, but a page/document layout function 2810B applies to the editable-format document for execution. The automatic page/document layout section 2810 can specify (a) print, (b) storage (as immediate print format), or (c) storage and print as output destination.

For example, assume that (a) print is specified with a job ticket a added for the document 1 (2211-*a*, see FIG. 5). To specify the job ticket a, the user opens a job ticket selection screen for the document 1 using the archive management instruction section 3170 and selects the job ticket a from among the previously registered job tickets or prepares a new job ticket on the screen. The archive management service section 2230 performs the following processing for the pair of the document 1 (2211-*a*) and the job ticket a:

(1) First, the input job ticket a is compared with a set of the job tickets previously registered in the archive for the document 1 (2211) (hereinafter, also called registered job ticket string; in FIG. 5, job tickets 2211-*c*, 2211-*d*, . . . , 2211-*e*). If the input job ticket a matches the job ticket 2211-*c* for the immediate-print-format document, the immediate-print-format document (2211-*b*) of the document 1 (2211) is used intact for printing. In this case, the immediate-print-format document (2211-*b*) is input to the automatic page/document layout section 2810, but page/document layout for the job ticket a is already performed as page/document layout processing and thus the document is output intact without performing page/document layout processing. After this, processing is performed on a path of 1710-*a* and printing using the printer engine 500 is executed.

(2) If the input job ticket a does not match the job ticket 2211-*c* for the immediate-print-format document in the comparison in (1) above, a drawing section 2310 expands the editable-format document (2211-*a*) of the document 1 (2211) into dots and outputs dot image data. The automatic page/document layout section 2810 inputs the dot image data and performs page/document layout processing. The automatic page/document layout section 2810 conducts the page/document layout processing with the input of the dot image data. Data outputted from the automatic page/document layout section 2810 after conducting the page/document layout processing (in the immediate-print format) is subjected to processing on a path of 1710-*a* in FIG. 17. As a result, printing using the printer engine 500 is executed.

Assume that (b) storage is specified with the job ticket a added for the document 1 (2211-*a*). To specify the job ticket a, the user opens the job ticket selection screen for the document 1 using the archive management instruction section 3170 and selects the job ticket a from among the previously registered job tickets or prepares a new job ticket on the screen. The archive management service section 2230 performs the following processing for the pair of the document 1 (2211-*a*) and the job ticket a:

(1) First, the input job ticket a is compared with a set of the job tickets previously registered in the archive for the document 1 (2211) (hereinafter, also called registered job ticket string; in FIG. 5, job tickets 2211-*c*, 2211-*d*, . . . , 2211-*e*). If the input job ticket a matches the job ticket 2211-*c* for the immediate-print-format document, the immediate-print-format document (2211-*b*) of the document 1 (2211) is already prepared for the input job ticket a and thus the processing is terminated.

(2) If the input job ticket a does not match the job ticket 2211-*c* for the immediate-print-format document in the comparison in (1) above, the drawing section 2310 expands the editable-format document (2211-*a*) of the document 1 (2211) into dots and outputs dot image data. The automatic page/document layout section 2810 inputs the dot image data and performs page/document layout processing. The automatic page/document layout section 2810 conducts the automatic page/document layout processing with the input of the dot image data. Data outputted from the automatic page/document layout section 2810 after conducting the page/document layout processing (in the immediate-print format) is subjected to processing on a path of 1710-*b* in FIG. 17, to thereby store the immediate-print-format document (2211-*b*) of the document 1 in the archive 2200.

The processing contents performed when (c) storage and print is specified with the job ticket a for the document 1 (2211-*a*) are basically similar to those when (a) print or (b) storage is specified. In this case, data from the automatic page/document layout section 2810 after conducting the automatic page/document layout processing (in the immediate-print format) is subjected to processing on a path of 1719-*c* in FIG. 17. With this processing, the data from the automatic page/document layout section 2810 after performing the automatic page/document layout processing is stored in the archive 2200 as an immediate-print-format document 1740-3. After this, the contents of the immediate-print-format document 1740-3 are sent to the printer engine 500 and are also printed.

In the single immediate-print-format document and job ticket method, when (b) storage or (c) storage and print is specified for one document, if an immediate-print-format document does not yet exist in the archive for the document (for example, document 3 in FIG. 5), the immediate-print-format document prepared by executing automatic page/document layout is stored intact in the archive. On the other hand, if an immediate-print-format document already exists in the archive for the document (for example, the document 1 in FIG. 5), the immediate-print-format document prepared by executing automatic page/document layout is stored in the archive in an overwrite manner. This means that the new prepared immediate-print-format document is stored in place of the immediate-print-format document already existing in the archive. To overwrite the already existing document, the archive management instruction section 3170 displays a message prompting the user to respond to the overwrite with Yes or No on the screen of the computer 300. The already existing document is overwritten with the new prepared immediate-print-format document for storage only when the user responds with Yes; not when the user responds with No.

On the other hand, when the multiple immediate-print-format document and job ticket method is used, it is assumed that (b) storage or (c) storage and print is specified for one document. If an immediate-print-format document does not yet exist in the archive for the document (for example, the document 3 in FIG. 5), the immediate-print-format document prepared by executing automatic page/document layout is stored intact in the archive. If an immediate-print-format document already exists in the archive for the document (for example, the document 1 in FIG. 5), the immediate-print-format document prepared by executing automatic page/document layout is also stored in the archive as a different file.

The job ticket added by the user specifying (b) storage or (c) storage and print is also stored as a file linked with the above-mentioned different file.

To use the multiple immediate-print-format document and job ticket method, all immediate-print-format documents for each job ticket can be retained in the archive. Therefore, the method has the advantage that printing with the maximum performance of the print engine can always be guaranteed when an already registered job ticket is specified for printing one document.

On the other hand, to use the single immediate-print-format document and job ticket method, if an already registered job ticket is specified for printing one document, when the specified job ticket is not for immediate-print-format document, the document cannot necessarily be printed with the maximum performance of the print engine, because an editable-format document is input in the method and the drawing section expands the document into a dot image before the document is printed. This point will be further discussed later.

Figure 20:
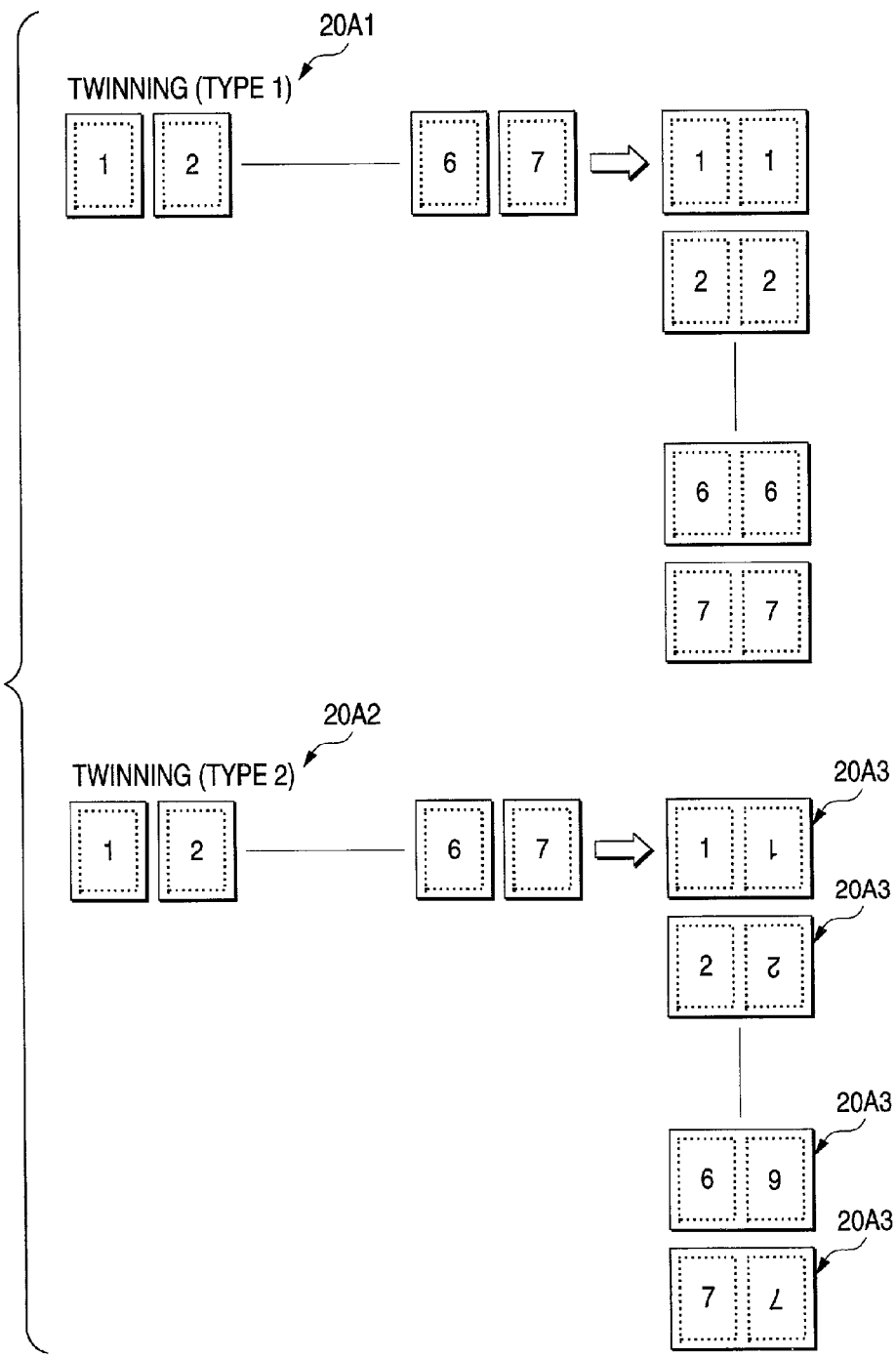
FIG. 20 is a drawing to describe page/document layout processing in the invention.
Figure 21:
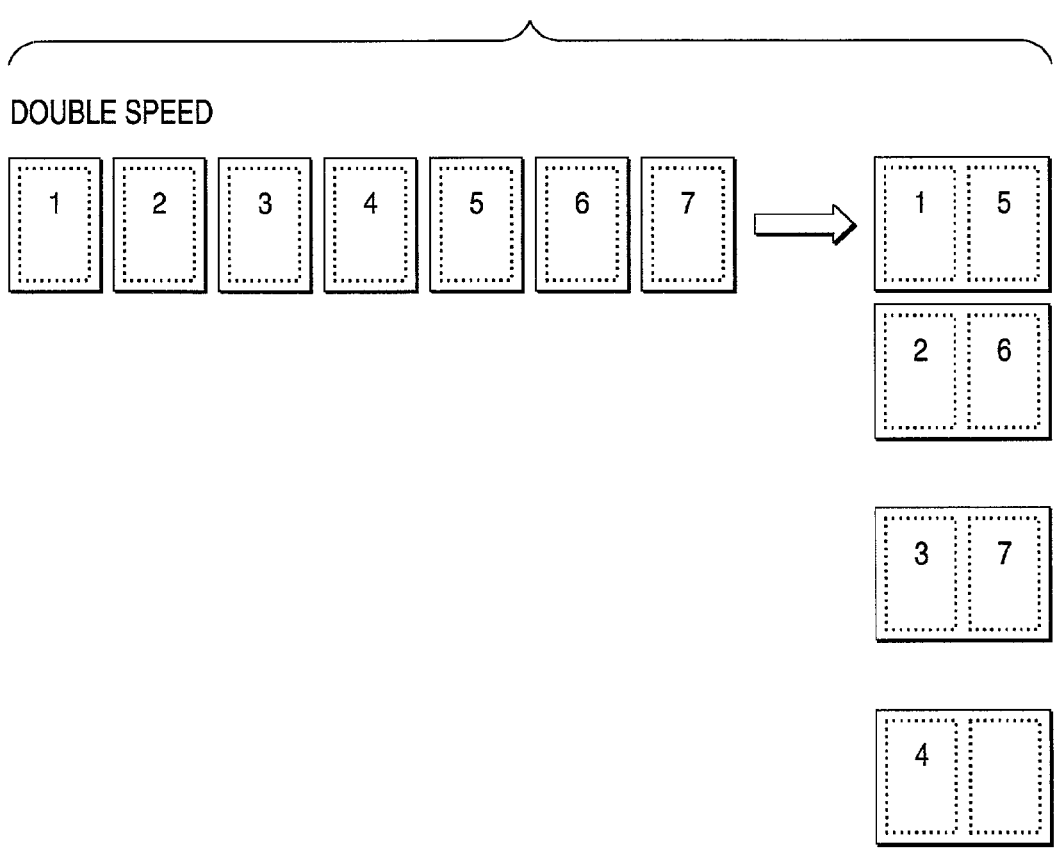
FIG. 21 is a drawing to describe page/document layout processing in the invention.

1UP, 2UP, 4UP, saddle stitch, twinning, and double speed are provided as the types of page/document layout and using the above-described job ticket, the archive management instruction section 3170 gives an instruction to the archive management service section 2230. FIGS. 18, 19 and 20 show the page/document layout types.

To ensure printing with the maximum performance of the print engine, storage is specified as the output destination, the document undergoing page/document layout is prepared as the immediate-print-format document (1740-3), which is once stored in the archive. The archive management instruction section 3170 instructs the archive management service section 2230 to print the document (1740-3) stored in the archive with the document name and the job ticket name corresponding to the immediate-print-format document, so that printing with the maximum performance of the print engine is guaranteed.

Automatic page/document layout is executed according to the described method, whereby when a document is initially stored in the archive in the editable format, automatic page/document layout is performed for the document and is stored in the immediate print format, so that the document can be stored not only in the editable format, but also in the immediate print format. At this time, the documents stored in both the editable format and the immediate print format are managed under the same name for improving the ease of use of the user, as described later. At this time, either the editable format or the immediate print format can be deleted. Accordingly, the documents managed under the same name can be stored in the archive in the editable format or the immediate print format or in combination thereof.

The processing contents in the printer controller 200 will be discussed in detail with reference to FIGS. 2, 4, 5, and 6.

Figure 2:
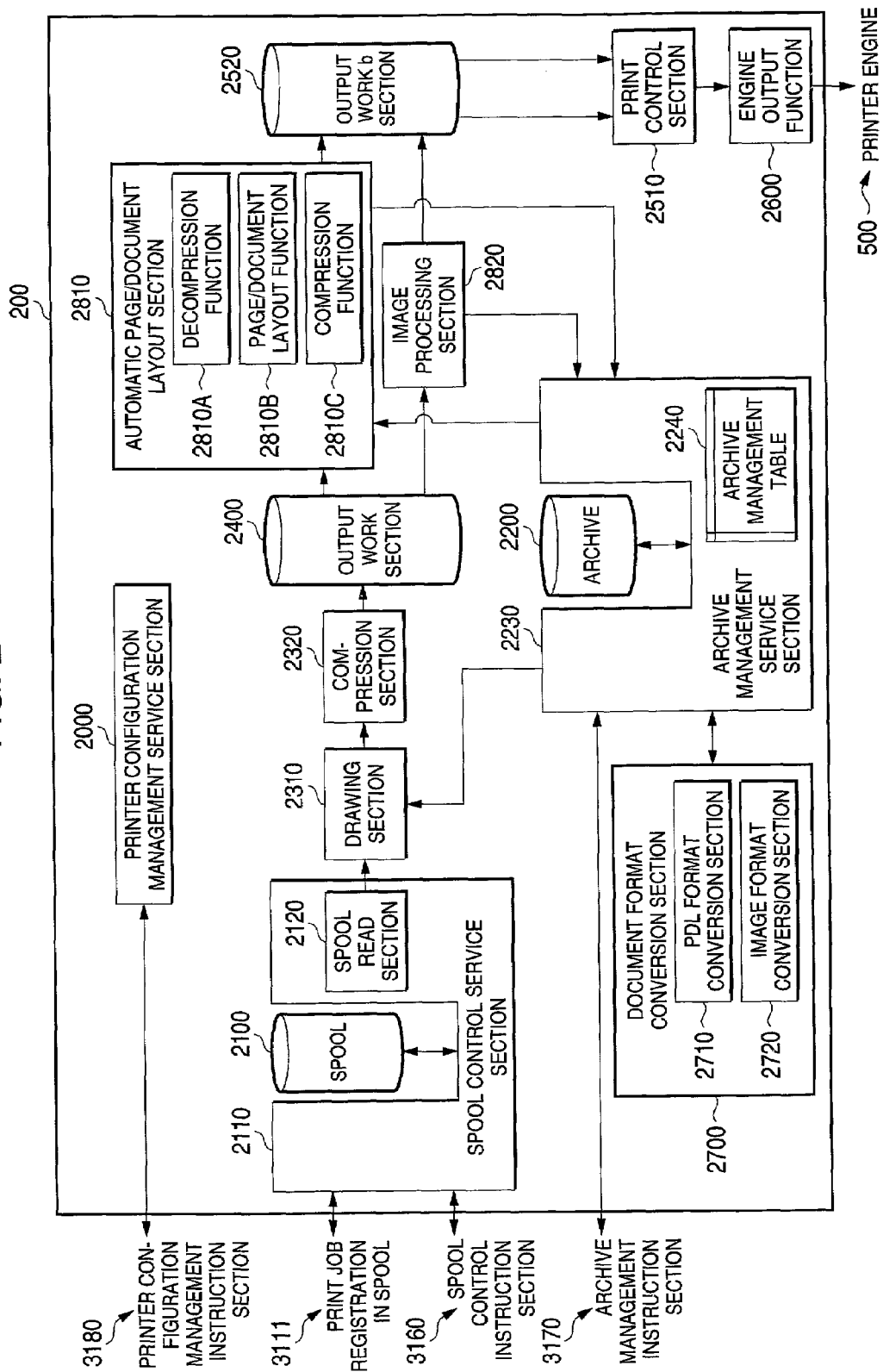
FIG. 2 is a block diagram to describe a control system of a printer controller in the invention.
Figure 6:
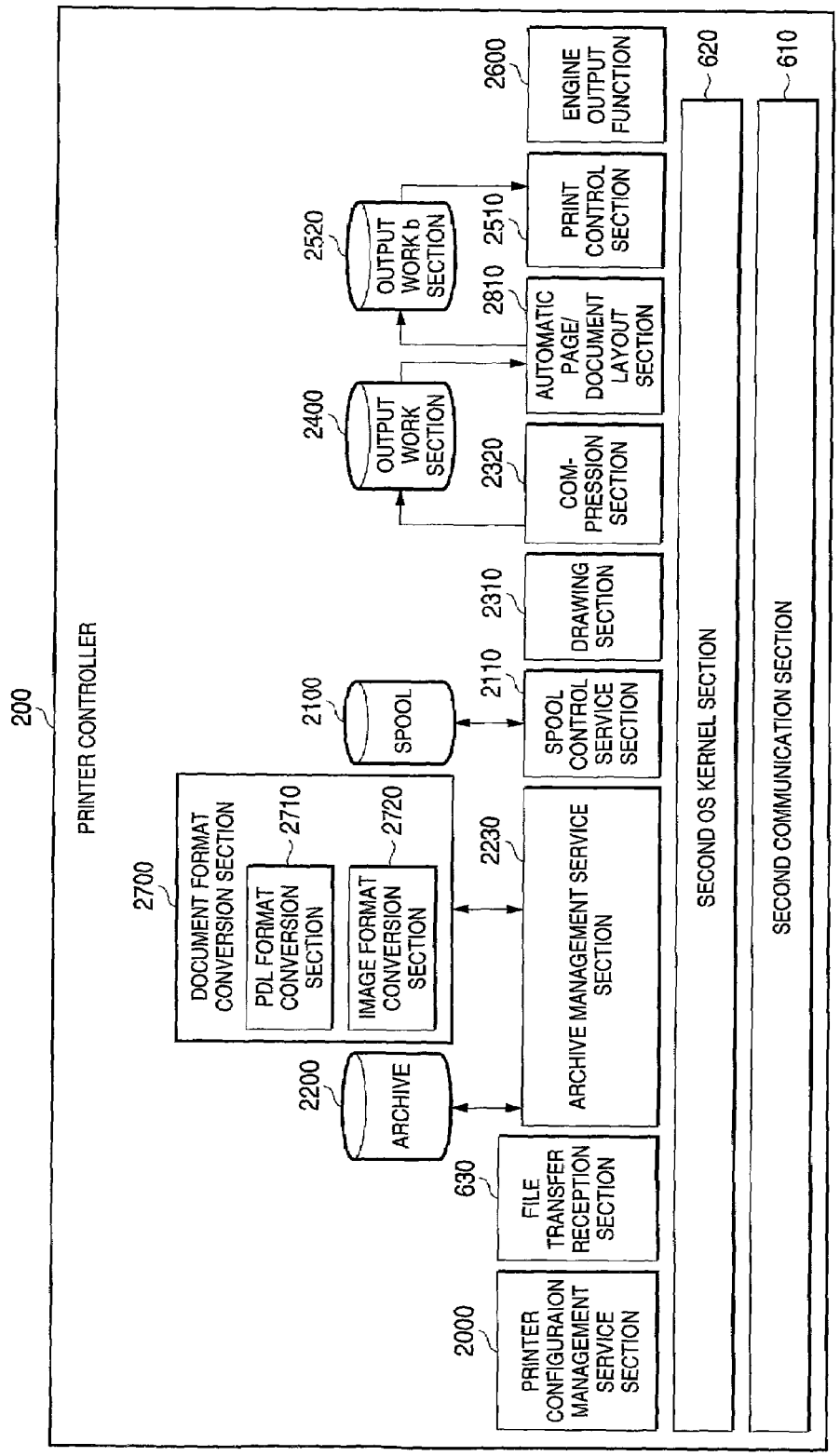
FIG. 6 is a block diagram to describe the configuration of the printer controller in the invention.

As shown in FIGS. 2 and 6, the printer controller 200 is made up of a second communication section 610, a second OS kernel section 620, spool 2100, the above-described archive 2200, an output work section 2400, an output work b section 2520, and processing sections on the second OS kernel section 620.

The second OS kernel section 620 is basic software (also called operating system) for controlling the hardware, user interface, etc., implementing the printer controller 200.

The second communication section 610 is made up of hardware and software for the printer 100 to communicate with various machines on the network 400 (computers, printers, scanners, etc.,). It can also be regarded as a part of the second OS kernel section 620, but is described as a separate component to clarify the point.

The spool 2100, the archive 2200, and the output work section 2400 will be discussed.

The spool 2100 is a queue for accepting and registering various requests for print, etc., issued by the computer 310, 320, 330 to the printer controller 200 (the requests will be hereinafter called print requests). The various requests issued from each computer to the printer controller 200 include (a) print, storage, and storage and print requests issued from the archive management instruction section 3170 to the archive management service section 2230 and (b) print requests through the printer logical driver section 3130 from the application program section 3140.

The printer controller 200 registers the above-mentioned print requests as print jobs in the spool 2100 in the order as they are accepted. In this case, a pair of (i) management information of the job name (with the serial number), the registration date and time, the print document capacity (size), job ticket, etc., for managing each print job and (ii) print data of the actual print contents is registered as a file. For (a) "print, storage, and storage and print requests issued from the archive management instruction section 3170 to the archive management service section 2230" mentioned above, editable-format documents and immediate-print-format documents are used as the print data. On the other hand, for (b) "print requests through the printer logical driver section 3130 from the application program section 3140" mentioned above, PDL-format documents are used as the print data.

The spool control service section 2110 executes the following three functions:

(1) Acceptance of print jobs and registration in the spool.

(2) Execution of the print jobs already stored in the spool in the acceptance order.

(3) Execution of requests issued from the spool control instruction section 3160 in the computer 310, 320, 330.

In (1) above, the spool control service section 2110 accepts (a) print, storage, and storage and print requests issued from the archive management instruction section 3170 to the archive management service section 2230 and (b) print requests through the printer logical driver section 3130 from the application program section 3140 as the above-mentioned various requests issued from each computer to the printer controller 200, as described above.

In (2) above, a spool read section 2120 reads and processes the print jobs in the spool 2100 in order. At this time, for (b) "print requests through the printer logical driver section 3130 from the application program section 3140" mentioned above, the spool read section 2120 reads and processes the PDL-format documents stored as the print data in the spool 2100 therefrom. To support a plurality of PDLs, the spool read section 2120 or the drawing section 2310 determines the PLD type and executes processing corresponding to the PLD. For (a) "print, storage, and storage and print requests issued from the archive management instruction section 3170 to the archive management service section 2230" mentioned above, the spool read section 2120 reads the document file name stored as the print data in the spool 2100. Subsequently, the spool read section 2120 reads and processes the document having the document file name from the archive 2200. The document having the document file name is stored in the archive 2200 as the editable format or the immediate print format.

The spool read section 2120 in the spool control service section 2110 shown in FIG. 2 reads the registered print jobs in the acceptance order and passes the print jobs to the following stage of the print processing.

The archive 2200 is a storage section for the printer controller 200 to store the document in response to a document registration or storage request issued from the computer 310, 320, 330 to the printer controller 200, as previously described with reference to FIGS. 16 and 17. The archive management service section 2230 shown in FIG. 2 accepts and processes various requests of registration, storage, print, storage and print, reference, deletion, name change, display/edit, move, copy, retrieval, etc., for the archive 2200. The various requests are processed as requests to read from, write into, etc., the archive 2200.

The above-described processing sections are installed in processing units called tasks or processes in the software field. The second OS kernel section 620 switches execution of each task in response to the input/output state between the printer controller and each of external machines and devices and the processing state in the printer controller. Thus, performance of print and storage in the printer controller is improved and the print throughput and the storage throughput are enhanced.

Specifically, the printer configuration management service section 2000, the archive management service section 2230, the spool control service section 2110, the drawing section 2310, a compression section 2320, the automatic page/document layout section 2810, a print control section 2510, and an engine/finisher control section 430 are provided as the tasks.

Figure 4:
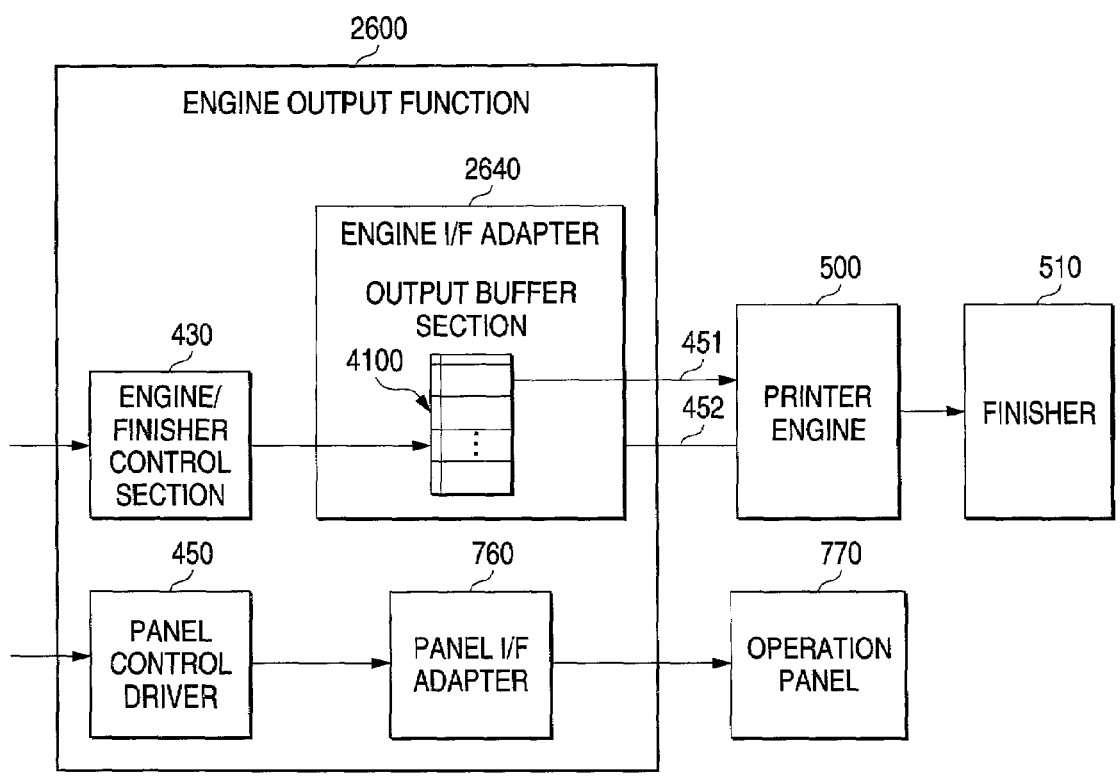
FIG. 4 is a block diagram to describe a control system of an engine output section of the printer controller in the invention.

The processing contents of the tasks will be discussed later with reference to FIGS. 2, 4, 6, etc. An outline is as follows:

The printer configuration management service section 2000 is a processing section for executing a request issued from the printer configuration management instruction section 3180 in the computer 310, 320, 330.

The archive management service section 2230 is a processing section for executing a request issued from the archive management instruction section 3170 in the computer 310, 320, 330, as previously described.

The drawing section 2310 inputs a PDL-format document and draws, namely, expands text, graphics, and image elements making up the PDL document into dots for output in the dot image format. The output from the drawing section 2310 is passed to the compression section 2320.

The compression section 2320 inputs the original document in the dot image format before compression and delivers output to the output work section 2400. The compression section 2320 is provided with a compression mode and a non-compression mode as the operation mode. In the compression mode, the compression section 2320 performs image compression processing for the input dot image data and outputs the dot image in a compression format with the data amount decreased to the output work section 2400. A proper compression algorithm is selected for use from among MH, MR, MMR, LZW, AHA, JBIG, JPEG, etc. In the non-compression mode, the compression section 2320 outputs the input dot image data intact in the non-compression format to the output work section 2400.

The automatic page/document layout section 2810 is made up of a decompression function 2810A, a page/document layout function 2810B, and a compression function 2810C for inputting and processing the dot image data in the output work section 2400. First, whether the input dot image data is in the non-compression format or the compression format is determined. If the input dot image data is in the non-compression format, it is input intact to the page/document layout function 2810B. If the dot image data is in the compression format, it is decompressed to the dot image data in the non-compression format by the decompression function 2810A and then the dot image data is input to the page/document layout function 2810B. The page/document layout function 2810B performs the above-described page/document layout processing and outputs the dot image data undergoing the page/document layout processing to the compression function 2810C. The compression function 2810C performs compression processing similar to that of the compression section 2320 for the input dot image data and outputs the compressed dot image data. The automatic page/document layout section 2810 processes the output for each of (a) storage, (b) print, and (c) storage and print previously described with reference to FIG. 17, as described below:

(1) Storage

The dot image data is output to the archive 2200 and is stored as document data in the immediate print format.

(2) Print

The dot image data is output to the output work b section 2520 and is stored. The data in the output work b section 2520 is later read by an engine output function 2600 and is printed.

(3) Storage and Print

The dot image data is output to the archive 2200 and is stored as document data in the immediate print format.

Then, the document data stored in the archive 2200 is output to the output work b section 2520 and is stored. The data in the output work b section 2520 is later read by the engine output function 2600 and is printed.

Figure 17:
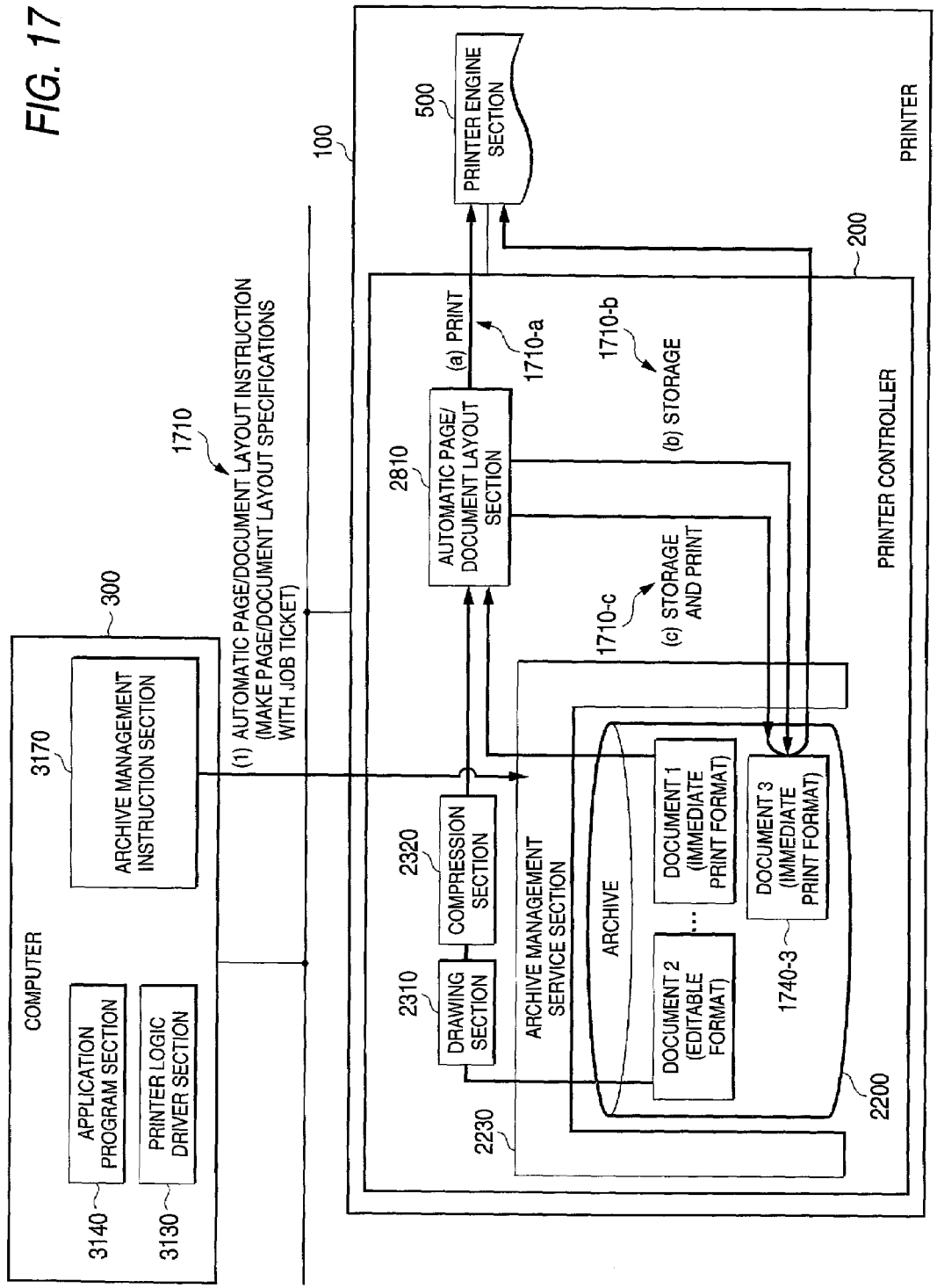
FIG. 17 is a drawing to describe page/document layout processing in the invention.

The automatic page/document layout method described with reference to FIG. 17 is called after-drawing automatic page/document layout method.

The automatic page/document layout method described with reference to FIGS. 17 and 2 can also be provided if it is changed as follows (the automatic page/document layout method is called before-drawing automatic page/document layout method): In the before-drawing automatic page/document layout method, an editable-format document is read from the archive 2200 and is input to an automatic page/document layout B section (not shown), which then performs automatic page/document layout processing for the input editable-format document and outputs the automatic page/document layout result to the drawing section 2310 as editable-format document. The contents of the automatic page/document layout processing are similar to those of the after-drawing automatic page/document layout method, and page/document layout of 1UP, 2UP, 4UP, saddle stitch, twinning, double speed, etc., previously described with reference to FIGS. 18 to 21 is performed.

Two types of twinning shown in FIG. 20 are provided. In type 1 (20A1) of twinning, two sides are placed in the same orientation. On the other hand, in type 2 (20A2) of twinning, either of two sides is rotated 180 degrees for placement, as shown in 20A3.

In the print system, either of the two types of twinning can be selected by selecting a job ticket. Only one type of twinning can also be installed for eliminating the need for selecting the job ticket.

Since the page/document layout processing can be performed with an editable-format document as input and output, the before-drawing automatic page/document layout method has the advantage that the image quality of the page/document layout result is not degraded if such page/document layout processing involving scaling not covered in FIGS. 18 to 21 is performed.

The automatic page/document layout method described with reference to FIGS. 17 and 2 can also be provided if it is further changed as follows (the automatic page/document layout method is called immediate-print-format document input and automatic page/document layout method): In the immediate-print-format document input and automatic page/document layout method, an editable-format document in the archive 2200 is expanded into dots by the drawing section 2310 under 1UP, single-sided print specifications and then is compressed by the compression section 2320 and the compressed document is once stored in the archive 2200 as original document in the immediate print format. In the method, the original document in the immediate print format is read from the archive 2200 and is input to an automatic page/document layout C section (not shown), which then performs automatic page/document layout processing for the input immediate-print-format document and outputs the automatic page/document layout result as immediate-print-format document. Storage, print, or storage and print can be selected as the output destination, as previously described with reference to FIG. 17. The contents of the automatic page/document layout processing are similar to those of the after-drawing automatic page/document layout method and the before-drawing automatic page/document layout method described above, and page/document layout of 1UP, 2UP, 4UP, saddle stitch, twinning, double speed, etc., previously described with reference to FIGS. 18 to 21 is performed. Unlike the after-drawing automatic page/document layout method or the before-drawing automatic page/document layout method, the immediate-print-format document input and automatic page/document layout method has the advantage that processing of the drawing section 2310 need not be performed whenever automatic page/document layout is performed. In the immediate-print-format document input and automatic page/document layout method, the drawing section may be operated only once for each document for preparing an original document in the immediate print format once.

In the automatic page/document layout processing described above, storage processing and print processing are operated separately, whereby the whole performance of the print system can be improved.

The print control section 2510 reads the dot image data in the compression format from the output work b section 2520 and outputs the dot image data to the engine output function 2600.

The engine output function 2600 inputs the dot image data in the compression format from the print control section 2510 and performs various types of processing for the dot image data and then outputs the result to the printer engine 500.

The dot image data previously compressed in the compression section 2320 or the compression function 2810C undergoes decompression processing in an engine I/F adapter 2640 in the engine output function 2600 to restore to raw dot image data, which is then output to the printer engine 500.

The processing of the tasks described above is performed by software, but auxiliary hardware for sharing execution of processing the whole or a part of each task can also be installed for improving the processing performance of each task. For example, if the auxiliary hardware is installed for the drawing section 2310, the compression section 2320, the decompression function 2810A, and the compression function 2810C, the effect is large. In the invention, it is also provided optionally if performance improvement is required.

The processing contents of the printer controller 200 will be discussed in more detail with reference to FIG. 2.

A request issued from the printer configuration management instruction section 3180 is accepted and executed by the printer configuration management service section 2000.

A print job registration request 3111 in the spool is accepted by the spool control service section 2110 and is registered in the spool 2100 as a print job. As previously described with reference to FIG. 3, the computer 300 issues the print job registration request 3111 to the printer as (a) print, storage, or storage and print request issued from the archive management instruction section 3170 to the archive management service section 2230, (b) print request through the printer logical driver section 3130 from the application program section 3140 or the like.

The spool read section 2120 reads and executes the print jobs stored in the spool in order. The spool read section 2120 analyzes each of the processing requests corresponding to (a) and (b) described above from each computer and determines that it is any of the following:

Codes 1 to 4 are assigned as follows:

(1) Print through the printer logical driver section from the application program section: Code 1.

(2) Storage instruction for one document n, job ticket a from the archive management instruction section: Code 2.

(3) Print instruction for one document n, job ticket a from the archive management instruction section: Code 3.

(4) Storage and print instruction for one document n, job ticket a from the archive management instruction section: Code 4.

If codes 2 to 4 are specified, storage, print, and storage and print are performed according to the procedures previously described with reference to FIGS. 17 and 2.

The print control section 2510 performs the following processing:

(1) Page sequence control.

(2) Setting engine control information and finisher control information for each page.

In the page sequence control in (1), the logical page order of a document received from the computer 310, 320, 330 is converted into the physical page order required at the print time by the printer engine 500.

In a single-sided printing mode, normally the page order is not converted.

In a double-sided printing mode, page order conversion requested by the printer engine 500 is executed.

Normally, the following two types are available:

(a) Double-sided printing of round type The logical page order of page 1, page 2, page 3, page 4, page 5, page 6, page 7, page 8, page 9, page 10 is converted into the physical page order determined by the number of accumulated sheets for each paper size. To print 10 pages when the number of accumulated sheets is three, the page order is converted into page 2, page 4, page 6, page 1, page 8, page 3, page 10, page 5, page 7, page 9.

(b) Double-sided printing of intermediate tray type The logical page order of page 1, page 2, page 3, page 4, page 5, page 6, page 7, page 8, page 9, page 10 is converted into the physical page order determined by the maximum number of sheets stored in an intermediate tray for each paper size. To print 10 pages when the maximum number of sheets stored in the intermediate tray is three, the page order is converted into page 4, page 5, page 6, page 1, page 2, page 3, page 9, page 10, page 7, page 8.

In (2), the engine control information and the finisher control information are set for each page. The engine control information is set for a paper feed section and a paper discharge section, and stapling, punching, side stitch, saddle stitch, and the like are set in the finisher control information.

Various requests issued from the spool control instruction section 3160 are accepted and executed by the spool control service section 2110. For example, the following are provided as the various requests:

(1) Listing of print jobs
(2) Deletion of print job
(3) Holding of print job
(4) Releasing of holding of print job
(5) Display of print job detail information
(6) Temporary stop of printer
(7) Restart of print
(8) Deletion of all print jobs in printer
(9) State display of printer
(10) Display of specifications and setup values of printer Various requests issued from the archive management instruction section 3170 are accepted and executed by the archive management service section 2230. For example, the following are provided as the various requests, as described above:

(1) Listing of documents (with sort function)
(2) Deletion of document
(3) Print of document
(4) Storage of document
(5) Storage and print of document
(6) Display/edit of document
(7) Name change of document
(8) Move of document
(9) Copy of document
(10) Retrieval of document
(11) Registration of editable-format document
(12) Registration of immediate-print-format document
(13) Listing of folders (with sort function)
(14) Creation of folder
(15) Deletion of folder
(16) Name change of folder
(17) Move of folder
(18) Copy of folder In (3) Print of document, (4) Storage of document, and (5) Storage and print of document, job tickets are used to make specifications for page/document layout, the paper feed section, and the paper discharge section, as described above.

In (11) Registration of editable-format document, a document in the PDL format in the computer is registered as an editable-format document in the archive, as previously described with reference to FIG. 16. In (12) Registration of immediate-print-format document, a document in the dot image format in the computer is registered as an immediate-print-format document in the archive, as previously described with reference to FIG. 16.

Next, the processing contents of the engine output function 2600 will be discussed with reference to FIG. 4.

The engine output function 2600 is made up of the above-mentioned engine/finisher control section 430, the above-mentioned engine I/F adapter 2640, a panel control driver 450, and a panel I/F adapter 760. In processing of the engine/finisher control section 430 and the panel control driver 450, input/output control of each component is performed through hardware adapters for controlling each component and device (printer engine 500, finisher 510, operation panel 770), such as the engine I/F adapter 2640 and the panel I/F adapter 760.

The print control section 2510 instructs the engine/finisher control section 430 to read data in the dot image format from the output work b section 2520 and write into an output buffer section 410 in sequence. The output buffer section 410 is provided in the engine I/F adapter 2640 and is made up of output buffers for a plurality of pages, so that (i) write into one output buffer and (ii) read from another output buffer (already written) by the engine/finisher control section 430 can be processed concurrently.

The engine/finisher control section 430 is installed as a task or a process and has a real-time input/output processing function with the printer engine 500 through the engine I/F adapter 2640. The engine/finisher control section 430 controls the engine I/F adapter 2640 to execute (i) and (ii) mentioned above while updating a management table concerning the output buffer section 410.

The panel control driver 450 is provided as a device driver so as to make it possible to use each task and process in the printer controller 200 to control the operation panel 770. The operation panel 770 is similar to an operation panel used with a normal printer. In FIG. 4, the finisher 510 can also be controlled through the printer engine 500 if the engine/finisher control section 430 controls the engine I/F adapter 2640.

Figure 7:
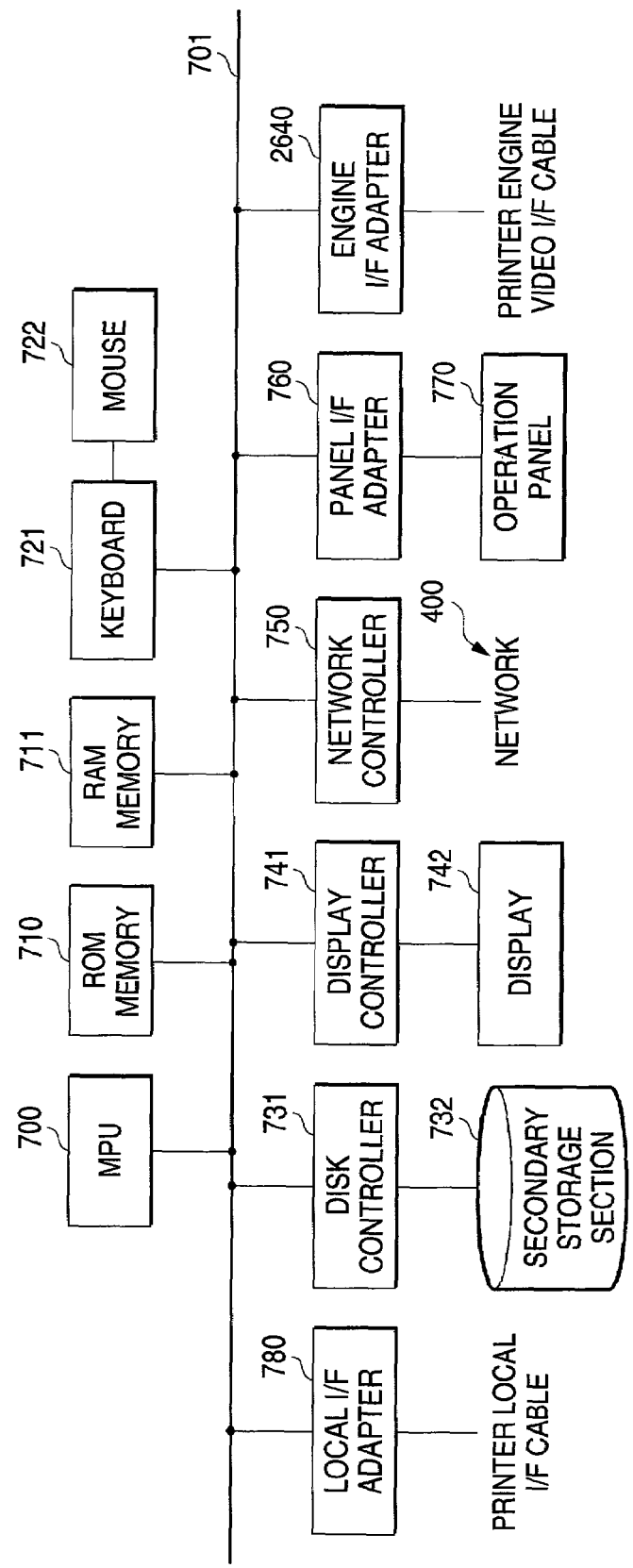
FIG. 7 is a block diagram of the hardware configuration of the printer controller in the invention.
Figure 8:
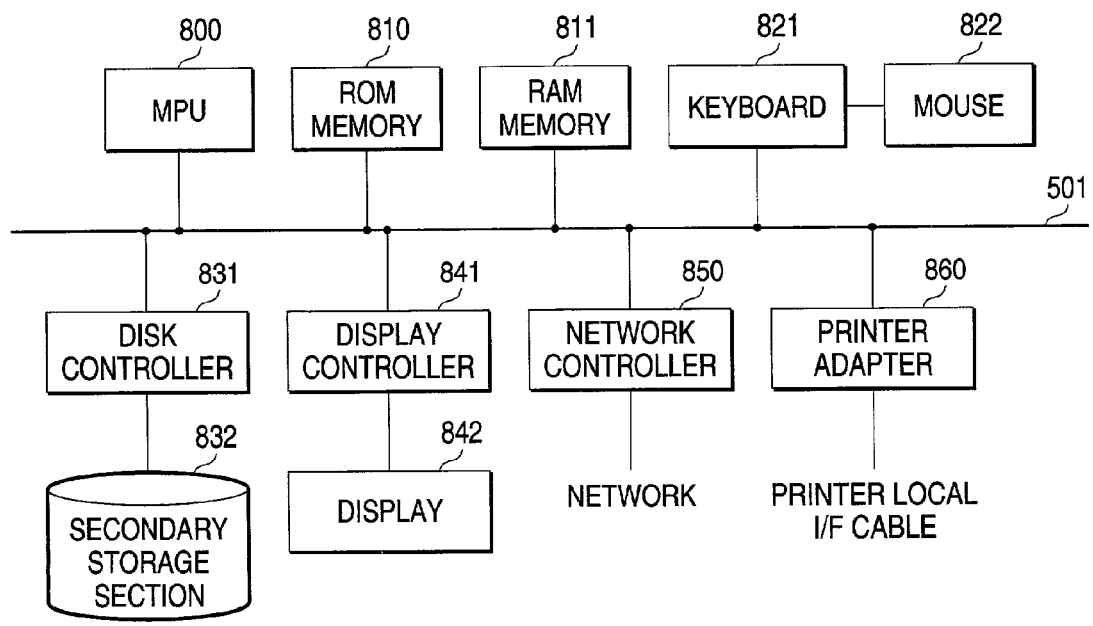
FIG. 8 is a block diagram of the hardware configuration of a computer in the invention.

Next, the hardware configurations of the units making up the print system will be discussed with reference to FIGS. 7 and 8.

First, the printer controller 200 will be discussed with reference to FIG. 7.

The printer controller 200 comprises an MPU 700, a system bus 701, ROM 710, RAM 711, a keyboard 721, a mouse 722, a disk controller 731, a secondary storage unit 732, a display controller 741, a display 742, a network controller 750, a local I/F adapter 780, the above-mentioned panel I/F adapter 760, the above-mentioned operation panel 770, and the above-mentioned engine I/F adapter 2640.

The system bus 701 consists of various input/output signals to and from the MPU 700 (address signals, data signals, and other control signals).

The MPU 700 executes input from and output to the peripheral units of the keyboard 721, the secondary storage unit 732, the display 742, the network 400, etc., and the memory such as the ROM 710 and the RAM 711.

The keyboard 721 is an input unit consisting of a plurality of input keyboards to which a mount, a kind of pointing device, is connected. The secondary storage unit 732 is connected to the system bus 701 through the disk controller 731 and the display 742 is connected to the system bus 701 through the display controller 741. The system bus 701 is connected to the network 400 such as a LAN or WAN through the network controller 750.

Ethernet, Token-Ring, FDDI (Fiber Distributed Data Interface), ATM (Asynchronous TransferMode), ISDN (Integrated Services Digital Network), or the like is used as a physical interface of the network 400, and an appropriate one is installed as the hardware logic of the network controller 750 in response to the type of physical interface to be used.

The local I/F adapter 780 is an adapter for connecting the printer controller 200 directly to the computer. In this case, Centronics, SCSI, fiber channel, IEEE 1394, USB, RS-232C, RS-422/423, or the like is used as an interface with the computer, and printer local I/F adapter is used to connect the printer controller 200 to the computer.

The panel I/F adapter 760 is an adapter for interfacing with the operation panel 770. In this case, RS-232C, a proper interface, or the like is used as the interface with the operation panel 770.

The engine I/F adapter 2640 is an adapter for interfacing with the printer engine 500. In this case, a video interface is used as the interface with the printer engine 500.

The ROM 710 stores an initial program loader (IPL) of the printer controller 200 and a part of character font.

The RAM 711 stores (a) printer controller control program, (b) the remainder of the character font, (c) various buffer memories, and (d) various management tables and others. To store (a) and (b), they are loaded by the initial program loader into the RAM 711 from the secondary storage unit 732. (a) and (b) may be previously stored in the ROM 710 rather than in the RAM 711. Conversely, the character font is not stored in the ROM 710 and may be all stored in the RAM 711.

The engine I/F adapter 2640 performs input/output with the printer engine 500 as instructed by the MPU 700.

The engine I/F adapter 2640 reads the contents of the output buffer section 410 in the adapter 2640 into the printer engine 500 (corresponding to 451). The read processing is performed using a DMA (Direct Memory Access) function contained in the engine I/F adapter 2640. Upon termination of reading the dot image data for one page of paper from the output buffer in the output buffer section 410, the engine I/F adapter 2640 asserts an interrupt signal (one of the bus signals for the MPU 700) for the MPU 700 for starting read termination interrupt service of the output buffer section 410 by the MPU 700. In the read termination interrupt service, the fact that the output buffer whose read is complete becomes available for printing the next page is set in the management table concerning the output buffer section, and the task of the engine/finisher control section 430, etc., waiting for the output buffer to become free is released from the idle state.

The engine I/F adapter 2640 decompresses the dot image data read in a compression format to restore to the precompressed dot image and converts the dot image from parallel form into serial form and then uses an image transfer signal 451 to and from the printer engine 500 for output to the printer engine 500. The image transfer signal 451 may be transferred in the parallel form intact without executing parallel-to-serial conversion.

The engine I/F adapter 2640 uses command transmission and status reception signal 452 to and from the printer engine 500 to transmit an inquiry or instruction command to the printer engine 500 and receive response status from the printer engine 500.

The engine I/F adapter 2640 can be installed in either of the following two ways: Mounting a dedicated subMPU to the adapter and performing necessary control processing by the MPU 700.

Next, the hardware configuration of the computer 300 will be discussed with reference to FIG. 8. The computer 300 comprises an MPU 800, a system bus 801, ROM 810, RAM 811, a keyboard 821, a mouse 822, a disk controller 831, a secondary storage unit 832, a display controller 841, a display 842, a network controller 850, and a printer adapter 860. The components other than the printer adapter 860 can be provided as with the printer controller 200.

The printer adapter 860 is used for the computer 300 to connect directly to the printer controller 200 using a printer local I/F cable. In this case, Centronics, SCSI, fiber channel, IEEE 1394, USB, RS-232C, RS-422/423, or the like is used as the interface between the computer and the printer controller 200.

Each of the documents stored in the archive maybe managed with the document name and the attributes of the document. In this case, the attributes contain a storage format group of arbitrary combinations of PDL format, display/edit format, dot image format of non-compression type, and dot image format of compression type.

The attributes of each document will be discussed with reference to FIG. 14. Each document is provided with two attributes of edit 1402 and print 1403, for example. The edit attribute 1402 is not necessarily required in the first embodiment and is used in second and third embodiments, but is described here.

The edit attribute 1402 is provided with two values of editable (indicated by the mark indicated by 1402-1) and edited (indicated by the mark indicated by 1402-2).

The editable 1402-1 indicates that the document is also stored in the editable format and can be displayed and edited using an edit application program as described in the second embodiment.

The edited 1402-2 indicates that the document, although it is in the editable format, is already edited with the edit application program and cannot be opened for display/edit at the second time or later with the edit application program (definition 1).

The edited 1402-2 can also be set as follows:

(1) The document can be opened any number of times for display/edit with the edit application program (definition 2).

(2) The document can be opened any number of times for display with the edit application program, but cannot be edited at the second time or later (definition 3).

That is, the edited 1402-2 can be defined in any of the definition 1, 2, or 3 or several combinations of the definitions 1, 2, and 3 can be supported.

Figure 14:
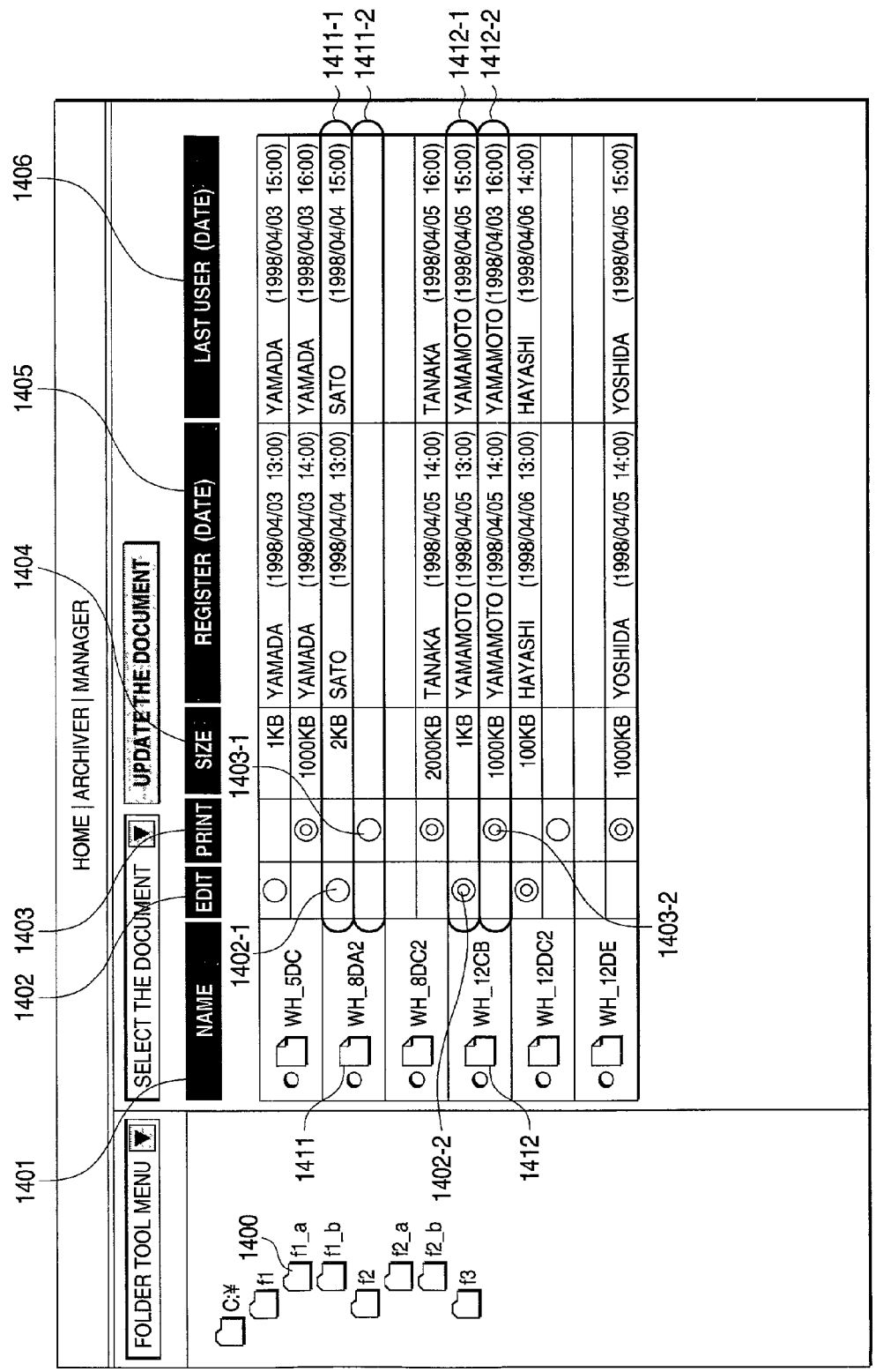
FIG. 14 is a drawing to describe user interface of the computer in the invention.

To use only the definition 2, if the edited 1402-2 is not displayed on the screen in FIG. 14, there is no problem on operation.

The print attribute 1403 is provided with two values of printable (indicated by the mark indicated by 1403-1) and fast printable (indicated by the mark indicated by 1403-2). The fast printable may be called immediately printable.

The printable 1403-1 indicates that there is a possibility that the document will not necessarily be printed with the maximum performance of the printer engine although it is printable, because document 1411 is stored only in the editable format and not in the immediate print format.

The fast printable 1403-2 indicates that the document can be printed with the maximum performance of the printer engine at high speed, because document 1411 is also stored in the immediate print format.

In the print system, printing one document from the immediate print format is faster than printing the document from the editable format, and thus the print attribute is provided. The reason why the former is faster than the latter is that to print the document in the editable format, the document (PDL format) undergoes processing of the drawing section 2310 and the compression section 2320 to prepare a document in the dot image format (compression type) in the output work section 2400 before the document is printed; whereas to print the document in the immediate print format, the processing of the drawing section 2310 and the compression section 2320 is not required and print processing can be started at the document in the immediate print format (dot image data of compression type) in the archive 2200. Particularly, it is difficult to guarantee that the maximum processing time of the drawing section 2310 per page is set to a given value or less. On the other hand, to print the document from the immediate print format, printing with the maximum performance of the printer engine can be guaranteed.

Each document has only one name 1401, but edit attribute 1402, print attribute 1403, size 1404, registration person (date and time) 1405, and last user (date and time) 1406 are described on two rows. The upper row indicates the attributes for the editable-format document and the lower row indicates the attributes for the immediate-print-format document.

Specifically, the document 1411 is stored as editable-format document and thus editable 1402-1 and the size, the registration person and date and time, and the last user and date and time of the editable-format document are recorded on upper row 1411-1. The document 1411 is not stored as immediate-print-format document and thus printable 1403-1 (stored as PDL document) is recorded on lower row 1411-2. The entries of the size, the registration person and date and time, and the last user and date and time are blank because there is no immediate-print-format document.

Document 1412 is stored as editable-format document, but is already edited, and thus edited 1402-2 and the size, the registration person and date and time, and the last user and date and time of the editable-format document are recorded on upper row 1412-1. The document 1412 is also stored as immediate-print-format document and thus fast printable 1403-2 and the size, the registration person and date and time, and the last user and date and time of the dot image document are recorded on lower row 1412-2.

If a request to print the document is issued from the computer to the printer with the above-mentioned document name (specification of the job ticket a as job ticket) under the described management, the print processing section in the printer determines which combination of the editable format, the immediate print format of non-compression type, the immediate print format of compression type, and the display/edit format the document is stored in based on the storage format group of one of the attributes of the document stored in the archive under the document name.

The document is printed by the optimum method in response to the determination result.

When the documents are stored in the archive as in FIG. 14, the user can execute fast document printing as follows:

Viewing the screen display of the document 1412, fast printable (mark 1403-2) isput on the document. Then, the user selects the document 1412 and opens the corresponding job ticket selection screen. Assume that job ticket 1
job ticket 2
job ticket 3*
job ticket 4
job ticket 5 are listed on the screen as the job tickets for the document 1412.

In the listing of the job tickets, an * mark is put on the job ticket 3, which means that the job ticket is a job ticket for an immediate-print-format document.

When the job ticket 3 is selected and the archive management instruction section 3170 instructs the archive management service section 2230 to print the document 1412, the document can be printed with the maximum performance of the printer.

Printing with the maximum performance of the printer engine cannot necessarily be guaranteed in the following cases because a document in the editable format in the archive 2200 undergoes processing of the drawing section 2310 before the document is printed:

(1) Case where the archive management instruction section 3170 gives an instruction for printing a document with no fast printable mark (for example, the document 1411).

(2) Case where for a document with a fast printable mark (for example, the document 1412), a job ticket with no * mark (for example, job ticket 2) is selected out of the jot ticket listing job ticket 1
job ticket 2
job ticket 3*
job ticket 4
job ticket 5 and a print instruction is given.

In the description with FIG. 14, only one immediate-print-format data is left for each document (above-described single immediate-print-format document and job ticket method) and thus an * mark is put only on one of the job tickets.

More than one immediate-print-format data is left for each document and a plurality of job tickets each with an * mark can also be left (above-described multiple immediate-print-format document and job ticket method). In this case, the chance for the user to be able to select a job ticket with an * mark is increased and the document can be printed using the immediate-print-format data corresponding to the selected job ticket marked *, so that the chance for printing with the maximum performance of the printer engine can be increased.

Next, the second embodiment of the invention will be discussed.

The drawings used with the description of the second embodiment are provided by adding components to the drawings used with the description of the first embodiment. Specifically, the components are added to FIGS. 2, 3, and 6. Other drawings used with the description of the first embodiment are also used intact for the description of the second embodiment.

The added components to the second embodiment are not required for the first embodiment. To save space of the drawings, the two embodiments are described with reference to the same drawings.

First, the components added to FIGS. 6, 2, and 3 will be discussed.

A document format conversion section 2700 is added to the printer controller 200, as shown in FIG. 6. It is a section for converting a document in a storage format stored in the archive 2200 into a document in a display/edit format. The document format conversion section 2700 is further provided with a PDL format conversion section 2710 and an image format conversion section 2720. As the storage format, the editable format and the immediate print format are designed and installed for use, as described above.

The PDL format conversion section 2710 is a section for converting a document in the editable format (one type of storage format) stored in the archive 2200 into a document in the display/edit format. PostScript (registered trademark) and PDF (Portable Document Format (registered trademark)) of Adobe, PCL-5, PCL-5E, PCL-6, PCL-XL (registered trademark) of Hewlett Packard, and the like are available, for example, as the editable format.

The display/edit format is a format for the application program section 3140 (containing an edit application program 1 section 3141 and an edit application program 2 section 3142) on the computer 300 to display a document on a screen and edit the document contents (page/document layout edit, etc.,) and includes PDF (Portable Document Format (registered trademark)) of Adobe, HTML (Hyper Text Markup Language), XML (eXtensible Markup Language), SGML (Standard Generalized Markup Language), EMF (Enhanced MetaFile) of Microsoft Corporation, etc. These do not necessarily match the above-described editable format, but they can be converted mutually.

The image format conversion section 2720 is a section for decompressing (converting) a document in the immediate print format of compression type (dot image data) stored as a document in the immediate print format (one type of storage format) in the archive 2200 into a document in the immediate print format of non-compression type (dot image data). Any desired one of the above-mentioned compression algorithms can be used. The decompression processing of the image format conversion section 2720 is performed using (a) software on the MPU 700 in the printer controller 200 or (b) dedicated hardware (not shown in FIG. 7).

The document format conversion section 2700, the PDL format conversion section 2710, and the image format conversion section 2720 shown in FIG. 2 have the same meanings as those previously described with reference to FIG. 6. As shown in FIG. 2, the archive management instruction section 3170 instructs the archive management service section 2230 to execute various archive management services. At this time, the necessity for converting the format of a stored document occur as required in response to the contents of the instruction given by the archive management instruction section 3170 to the archive management service section 2230. At this time, the archive management service section 2230 uses the document format conversion section 2700 to convert the document format.

Figure 3:
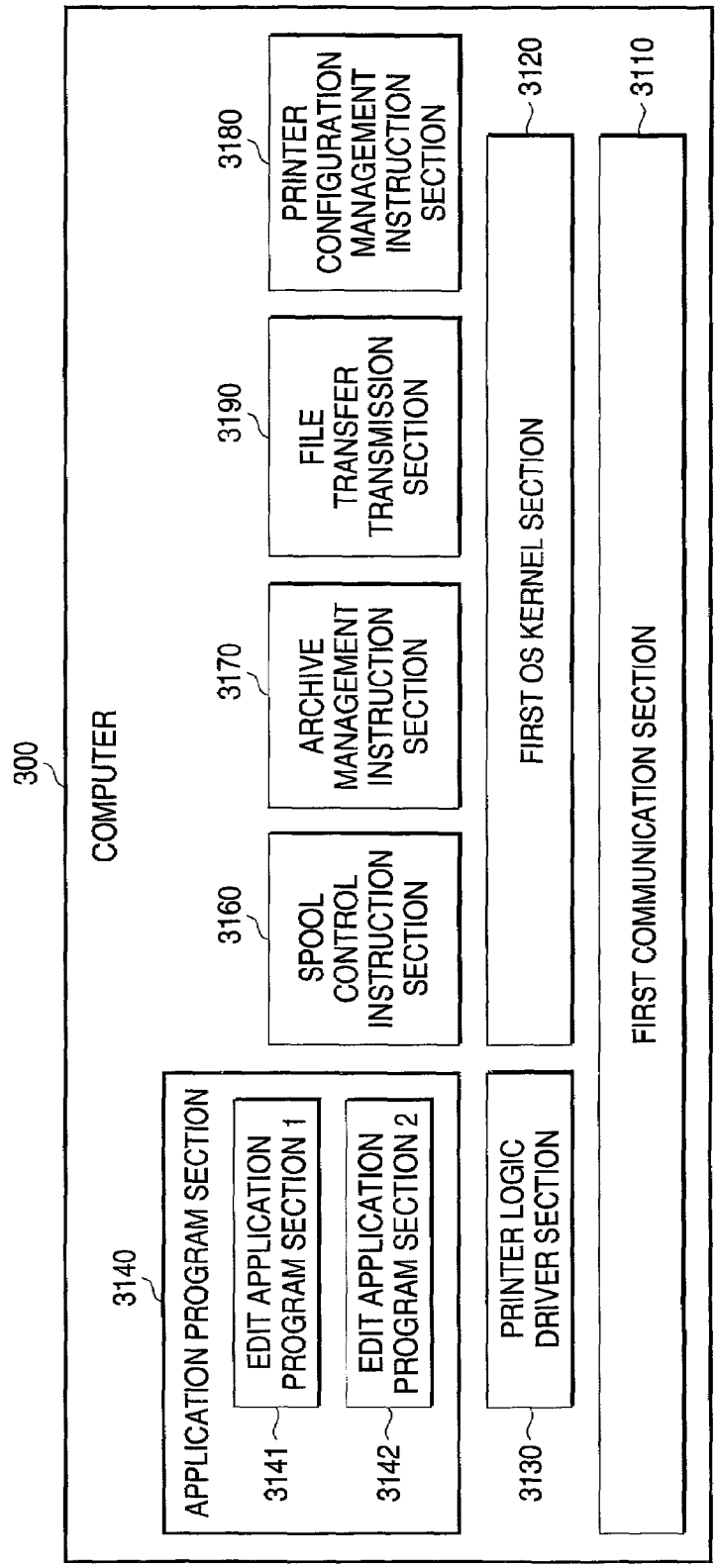
FIG. 3 is a block diagram to describe the configuration of a computer in the invention.

The computer is provided with the edit application program 1 section 3141 and the edit application program 2 section 3142, as shown in FIG. 3. The edit application program 1 section 3141 is an application program that can display/edit a document in the display/edit format such as PDF mentioned above. The edit application program 2 section 3142 is an application program for displaying and editing a document in the dot image format. The two types of dot image format, the non-compression type and the compression type are available; however, the description to follows assumes that the edit application program 2 section 3142 can process documents only in the non-compression type. If the edit application program 2 section 3142 can directly process documents in the compression type, the function can also be provided in a similar manner.

One program can also be provided with the functions of both the edit application program 1 section 3141 and the edit application program 2 section 3142. This means that the edit application program sections 3141 and 3142 can also be provided as a single program. Acrobat 4.0 (registered trademark) of Adobe, etc., is available as an example of the edit application program 1 section 3141.

As one of the display/edit functions, page/document layout function as previously described with reference to FIGS. 18 to 20 is also installed in the edit application program 1 section 3141 and the edit application program 2 section 3142. Unlike the page/document layout conducted by the automatic page/document layout section 2810 described in the first embodiment, the page/document layout is called interactive page/document layout, because a document in the archive 2200 is transferred to the computer 300 and page/document layout processing is performed in an interactive mode in the computer 300 while the user views a page/document layout processing screen. To start the interactive page/document layout, the user enters a display/edit command for one document on a document tool menu in FIG. 12.

In the embodiment, when a document is stored in the archive of the printer in the storage format from the computer and a request to display and edit the document is issued from the computer to the printer, processing is performed as follows:

The printer determines whether or not the format of the stored document in the printer is the same as the document format called the display/edit format required by the edit application program in the computer. If the format is the same as the document format, the document is read and is transferred from the printer to the computer. If the format is not the same as the document format, the document format conversion section in the printer is used to convert the format of the document stored in the archive (storage format) into the display/edit format and then the converted document is transferred from the printer to the computer.

When a document is stored in the archive of the printer in the storage format called the editable format from the computer and a request to display and edit the document is issued from the computer to the printer, processing is performed as follows:

The printer determines whether or not the format of the stored document in the printer is the same as the document format called the display/edit format required by the edit application program in the computer. If the format is the same as the document format, the document is read and is transferred from the printer to the computer. If the format is not the same as the document format, the PDL format conversion section in the printer is used to convert the document in the editable format (storage format) stored in the archive into a document in the display/edit format and then the converted document is transferred from the printer to the computer.

The edit application program 1 section in the computer reads the document in the display/edit format transferred from the printer and displays and edits the document.

When a document is stored in the archive of the printer in the immediate print format from the computer and a request to display/edit the document is issued from the computer to the printer, processing is performed as follows:

The printer determines the format of the document in the printer. If the format is the immediate print format and the dot image format of non-compression type, the document is read and is transferred from the printer to the computer. If the format is the immediate print format of compression type, the image format conversion section in the document format conversion section in the printer is used to convert the document in the immediate print format of compression type stored in the archive into a document in the immediate print format of non-compression type and then the converted document is transferred from the printer to the computer.

The edit application program 2 section 3142 in the computer reads the document in the dot image format of non-compression type transferred from the printer and displays and edits the document.

Each of the documents stored in the archive is managed with the document name and the attributes of the document, and the attributes contain a storage format group of arbitrary combinations of editable format, display/edit format, immediate print format of non-compression type, and immediate print format of compression type. The edit and print attributes of each document and use thereof are the same as the contents previously described with reference to FIG. 14 in the first embodiment. If the edit attribute 1402 and its values, the editable 1402-1 and the edited 1402-2, in FIG. 14 are used in the second embodiment, they are useful, but are not indispensable.

If a request to display/edit the document is issued from the computer to the printer with the above-mentioned document name under the described management, the print processing section in the printer determines which combination of the editable format, the display/edit format, the immediate print format of non-compression type, and the immediate print format of compression type the document is stored in based on the storage format group of one of the attributes of the document stored in the archive under the document name. The document is displayed and edited by the optimum method in response to the determination result.

For example, whether or not the document in the display/edit format is stored in the archive of the printer is deter-mined. If the document in the display/edit format is stored, it is transferred intact to the computer. The edit application program 1 section 3141 in the computer reads the transferred document in the display/edit format and displays and edits the document.

If it is determined that a document in the editable format is stored in the archive of the printer although the document in the display/edit format is not stored, the PDL format conversion section 2710 in the printer is used to convert the document in the editable format into the display/edit format and then the converted document is transferred to the computer. The edit application program 1 section 3141 in the computer reads the transferred document in the display/edit format and displays and edits the document.

If it is determined that a document in the immediate print format is stored in the archive of the printer although neither the document in the display/edit format nor the document in the editable format is stored, then whether or not the document in the immediate print format is of non-compression type is determined. If the document is of non-compression type, it is read intact and is transferred to the computer. If the document is of compression type rather than non-compression type, the image format conversion section 2720 in the printer is used to convert the document in the immediate print format of compression type stored in the archive into a document in the immediate print format of non-compression type and then the converted document is transferred to the computer.

The edit application program 2 section 3142 in the computer reads the transferred document in the dot image format (immediate print format) of non-compression type and displays and edits the document.

The edit attribute 1402 in FIG. 14 can be used, for example, as follows:

(a) If the edit attribute 1402 is the editable 1402-1, the document can be edited by the edit application program.

(b) If the edit attribute 1402 is the edited 1402-2, the edit operation that can be performed by the edit application program is controlled in response to which of the definitions 1, 2, and 3 the definition is as shown in the first embodiment.

For example, if the definition is definition 1 or 3, the document cannot be edited at the second time or later.

According to the second embodiment described above, if the storage format of a document in the printer does not match the display/edit format required by the edit application program, the document is converted from the storage format into the display/edit format, whereby the document can be displayed and edited by the edit application program. Specifically, if the storage format is the editable format or the immediate print format of compression type, it is converted into the display/edit format or the dot image format (immediate print format) of non-compression type, whereby the document can be displayed and edited by the edit application program. Accordingly, the convenience and the ease of use of the user can be enhanced.

In the first and second embodiments, each document is managed with the document name and the attributes of the document, whereby when the user operates (prints, displays, or edits) each document in the archive, he or she can do in an easy-to-understand manner without confusion. The documents whose contents are the same can be given different document names if the attributes differ. In this case, however, once the user gives the different document names, later the user may forget the fact that the documents have the same contents, and confusion may occur. The expression "the documents whose contents are the same" or "the documents have the same contents" means that the print results of the documents are completely the same regardless of which of the editable format, the immediate print format of compression type, and the immediate print format of non-compression type the storage format of each document is. If the user gives different document names to the documents different only in storage format and forgets the fact that the documents have the same contents, it becomes necessary to compare with the dot image data just before print in the printer engine 500 to check whether or not the contents of the documents are the same. In this case, the check processing becomes extremely large and the ease of use of the user and the system performance are degraded; this is a problem.

Next, the third embodiment of the invention will be discussed. The embodiment concerns a method of registering a document in the computer 300 in the archive 2200 of the printer controller 200 in the first and second embodiments. That is, it is an embodiment for executing document registration in FIG. 16 at high speed with high reliability. It is an embodiment for registering a PDL-format document in the computer 300 in the archive 2200 in the printer controller 200 as an editable-format document and registering a dot-image-format document in the computer 300 in the archive 2200 in the printer controller 200 as an immediate-print-format document.

The third embodiment will be discussed with reference to FIGS. 3, 6, and 15. As for FIGS. 3 and 6, components are added to the drawings used for the description of the first and second embodiments. Other drawings used with the description of the first embodiment are also used intact for the description of the first embodiment.

First, the components added to FIGS. 3 and 6 will be discussed.

A file transfer transmission section 3190 is added to the computer 300, as shown in FIG. 3. The file transfer transmission section 3190 reads a document in a secondary storage unit connected directly to the computer 300, called local secondary storage unit, or a secondary storage unit shared in the environment of the network 400, called shared secondary storage unit, and transfers the document to a file transfer reception section 630 (described later) in the printer controller 200.

The file transfer reception section 630 is added to the printer controller 200, as shown in FIG. 6. It receives a document transmitted by the computer 300 using the file transfer transmission section 3190.

Next, a procedure of registering a document in the computer 300 in the archive 2200 of the printer controller 200 will be discussed with reference to FIG. 15.

Figure 15:
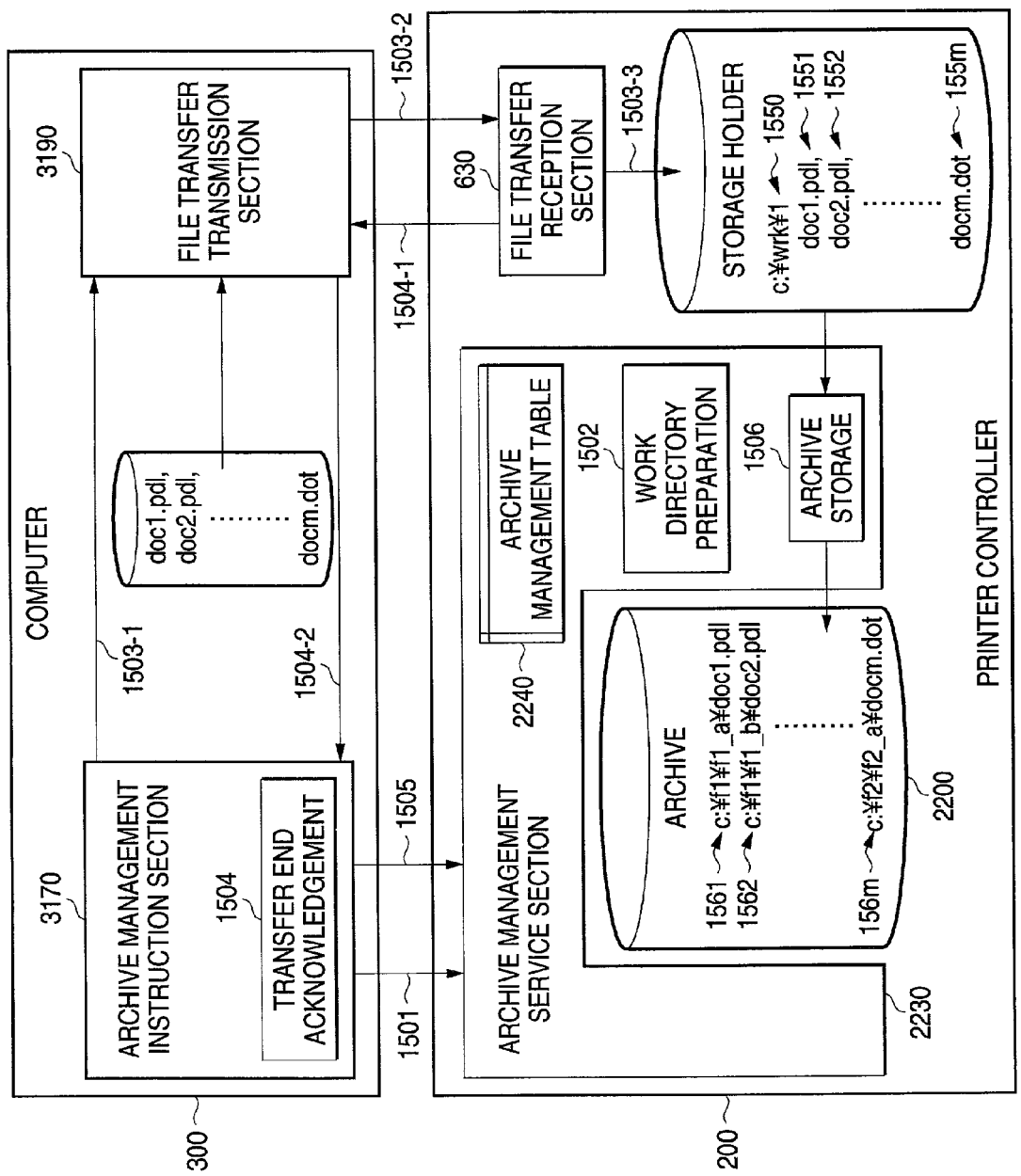
FIG. 15 is a block diagram to describe storage of documents in the printer controller from the computer in the invention.

First, the contents of 1501, 1502, etc., indicating transfer of information among the components shown in FIG. 15 are listed below:

1501: Document storage start request (storage folder name)
1502: Work directory creation
1503-1: Document transfer instruction (list of document file names)
1503-2: File transmission instruction
1503-3: Storage of string of document files in storage folder name
1504-1: Transfer end report
1504-2: Reception of transfer end report
1505: Document storage end request (string of pairs of (a) new folder name and (b) new document name for each document)
1506: Archive storage In FIG. 15, the following processing is performed in order while the above-mentioned information is transferred:

(1) First, the archive management instruction section 3170 in the computer 300 issues a document storage start request (1501) to the archive management service section 2230 in the printer controller 200. A storage folder name is added to the document storage start request (1501) as an attendant parameter. For example, c:¥wrk¥1 is added.

(2) As instructed by the document storage start request (1501), the archive management service section 2230 creates a work directory (1502) to store the file received by the file transfer reception section 630. At this time, the storage folder name c:¥wrk¥1 (1550) specified in the attendance parameter on the document storage start request (1501) is adopted as the name of the work directory. The printer controller 200 stores the received document file under the storage folder name.

(3) The archive management instruction section 3170 issues a document transfer instruction (1503-1) to the file transfer transmission section 3190 for instructing the file transfer transmission section 3190 to transfer a string of document files from the computer 300 to the printer controller 200. A list of document file names is added as an attendant parameter on the document transfer instruction 1503-1, such as doc1.pd1, doc2.pd1, . . . , docm.dot. Here, it is assumed that doc1.pd1 and doc2.pd1 are PDL documents and docm.dot is a dot-image-format document.

(4) The file transfer transmission section 3190 issues a file transmission instruction (1503-2) to the file transfer reception section 630, thereby transferring the string of document files. A list of document file names is added as an attendant parameter on the file transmission instruction (1503-2) as with the document transfer instruction (1503-1).

A protocol of ftp (file transfer protocol), HTTP (HyperText Transfer Protocol), etc., is used to transfer files between the file transfer transmission section 3190 and the file transfer reception section 630. More particularly, to use ftp, the files in the local secondary storage unit or the shared secondary storage unit managed by the computer 300 are sent to a program called an ftp server (corresponding to 630 in FIG. 15) in the printer controller 200. To use HTTP, the files in the local secondary storage unit or the shared secondary storage unit managed by the computer 300 are sent to a program called an HTTP server (corresponding to 630 in FIG. 15) in the printer controller 200.

(5) The file transfer reception section 630 stores the string of document files received under the storage folder name 1550 (c:¥wrk¥1) (1503-3). Consequently, mdocuments doc1.pd1, doc2.pd1, . . . , docm.dot are stored under the storage folder name 1550.

(6) Upon completion of storing all document files in the storage folder 1550 in 1503-3, the file transfer reception section 630 transmits a transfer end report (1504-1) to the file transfer transmission section 3190.

(7) The file transfer transmission section 3190 transmits the transfer end report to a transfer end acknowledgement section 1504 in the archive management instruction section 3170 (1504-2) for making a report of acknowledging storage of all document files in the storage folder 1550.

(8) The archive management instruction section 3170 issues a document storage end request (1505) to the archive management service section 2230 for instructing the archive management service section 2230 to store the string of document files already received in the storage folder 1550 in the archive 2200. A string of pairs of (a) new document storage folder name and (b) new file name for each document is added as an attendant parameter on the document storage end request (1505), such as c:¥f1¥f1_a, doc1.pd1, c:¥f1¥f1_b, doc2.pd1, . . . , c:¥f2¥f2_a, docm.dot.

The specification of (a) and (b) makes it possible to newly assign the storage folder name and the document name for each document file. The same as the original may be adopted. If the specification of (a) and (b) is omitted, it is also made possible to adopt the same storage folder name and the same document name for every document.

(9) Last, an archive storage section 1506 in the archive management service section 2230 stores documents 1551, 1552, . . . , 155*m* in the storage folder 1550 in the archive 2200 as 1561, 1562, . . . , 156*m*, and the processing is terminated. If the file transfer consisting of 1503-2 and 1503-3 results in failure, a report of the failure is made in 1504-1 and re-transfer is executed. If the re-transfer also results in failure, a message indicating the failure is displayed on the screen of the computer 300. If the file transfer results in failure, storage of the documents in the archive 2200 in (8) is not executed.

In the third embodiment described above, the following advantages are provided:

(1) To store documents in the print controller 200 from the computer 300, the standard file transfer means (ftp, HTTP, etc.,) can be used for file transfer. Therefore, program development for the file transfer is not required. The tried-and-tested file transfer function such as ftp is used, whereby the good performance and reliability of file transfer can also be provided.

(2) Further, it can be checked that the file transfer to the reception work directory (1550) results in success before the documents are stored in the archive 2200. Accordingly, the user or the system administrator can distinguish the storage failure in the archive 2200 from the file transfer failure. To directly store the documents in the archive 2200 without checking whether the file transfer results in success or failure, the user or the system administrator cannot distinguish the storage failure from the file transfer failure and thus a problem of difficulty to take steps at the fault time occurs.

Next, a fourth embodiment of the invention will be discussed with reference to FIGS. 22 and 23.

Figure 22:
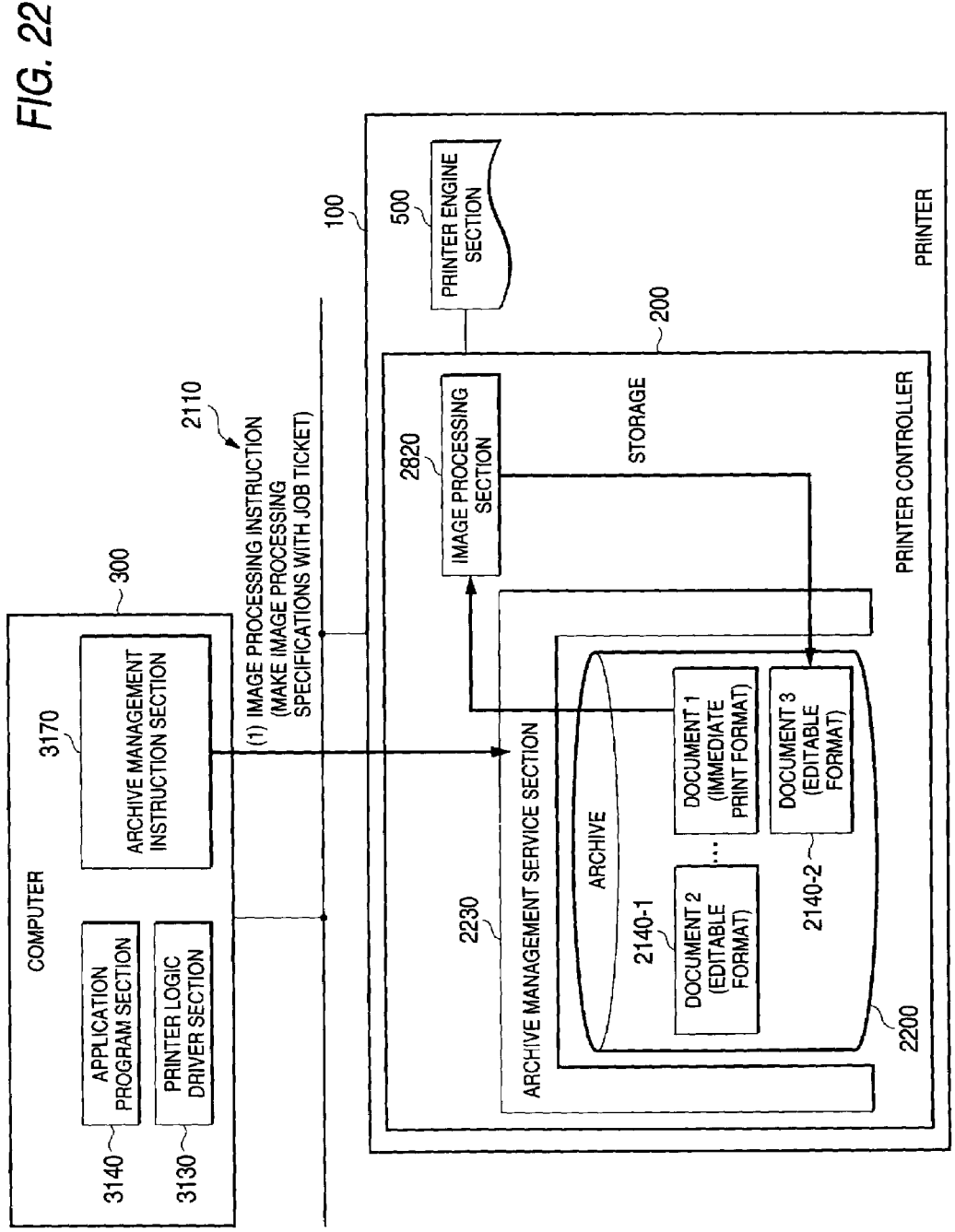
FIG. 22 is a block diagram to describe image processing in the invention.
Figure 23:
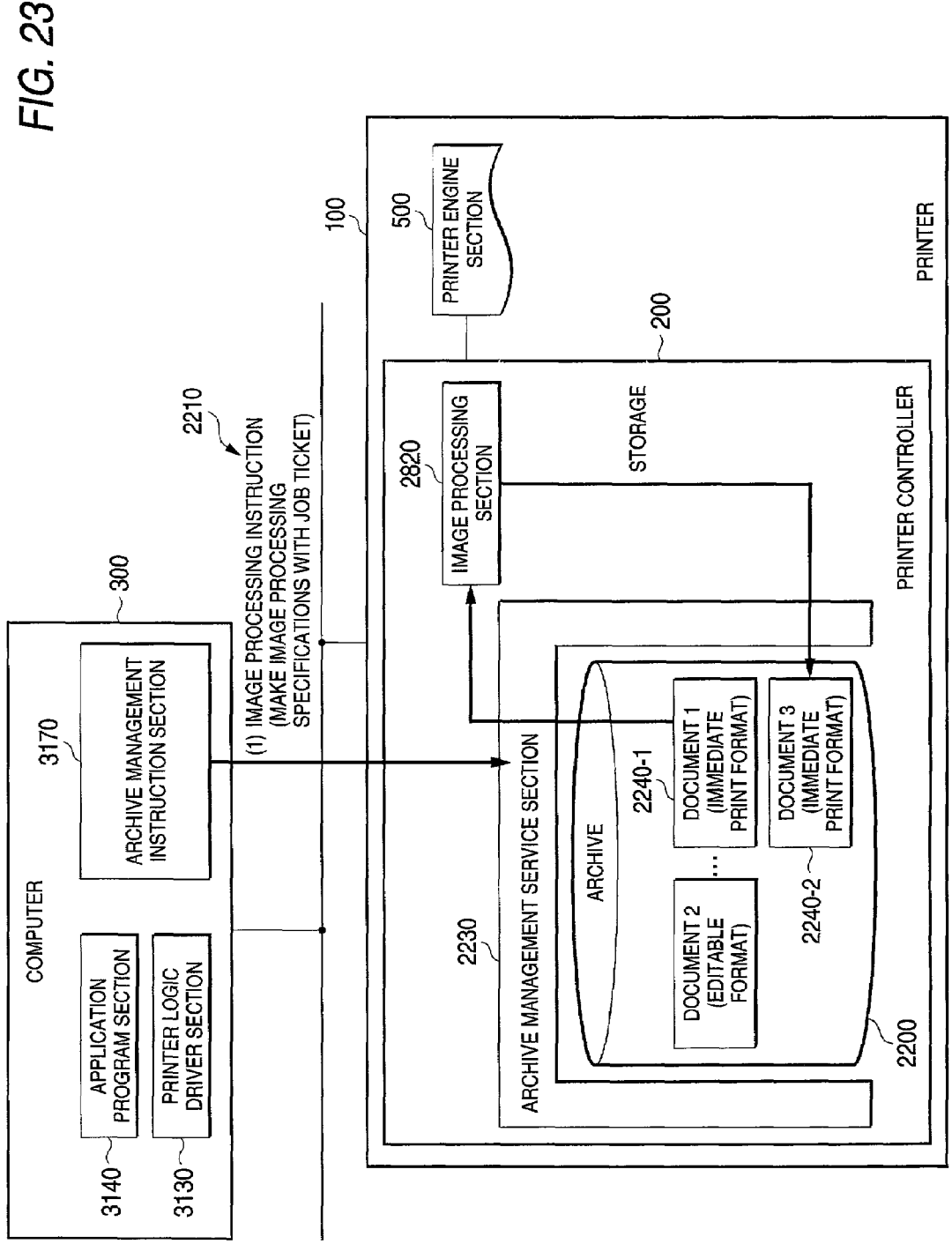
FIG. 23 is a block diagram to describe image processing in the invention.

An image processing section 2820 is provided in a printer controller 200, as shown in FIGS. 22 and 23. The relationship between the image processing section 2820 and other components in the printer controller 200 is similar to that between the automatic page/document layout section 2810 and other components in the printer controller 200 in the above-described embodiments; they differ in processing contents.

As described above, the automatic page/document layout section 2810 performs page/document layout processing and outputs the result as a document in the immediate print format. The image processing section 2820 performs image processing for a document stored in an archive 2200 for improving the image quality. Specifically, the image processing section 2820 performs dot density conversion of converting input image data at a coarse dot density as compared with a printer engine 500 into image data at a finer dot density for the printer engine 500 for improving the image quality, image quality improvement of a gray scale image, conversion of a color image to a monochrome image, etc. Also in this case, an archive management instruction section 3170 in a computer 300 gives an instruction for executing image processing with a parameter called a job ticket to an archive management service section 2230 in the printer controller 200. In this case, an output file name can be specified as the output destination for storage. Storage and print as well as storage may be specified.

FIG. 22 shows the case where input to and output from the image processing section 2820 are documents in the editable format. More particularly, the image processing section 2820 reads a document 2 in the editable format (2140-1) as input. Subsequently, the image processing section 2820 disassembles the document 2 (2140-1, PDL format) into components of text, graphics, and image elements and improves the image quality of the image element. The image processing section 2820 again assembles the text, graphics, and image elements into one document file in the editable format and outputs the document to the archive 2200 as a document 3 (2140-2). In the embodiment, image quality improvement of the text and graphics elements is not conducted, but may be executed.

FIG. 23 shows the case where input to and output from the image processing section 2820 are documents in the immediate print format. More particularly, the image processing section 2820 reads a document 1 in the immediate print format (2240-1) as input. Subsequently, the image processing section 2820 improves the image quality of dot image data, the contents of the document 1 (2240-1), and outputs the document to the archive 2200 as a document 3 (2240-2). The input/output data to/from the image processing section 2820 may be in the immediate print format of compression type. In this case, the image processing section 2820 performs processing in the following sequence:

(1) Decompressing a document in the immediate print format of compression type to non-compression-type image data.

(2) Executing image quality improvement processing for the non-compression-type image data.

(3) Compressing the non-compression-type image data which has undergone the image quality improvement processing to a document in the immediate print format of compression type (dot image data).

In the embodiment, the image processing is performed according to the described method, whereby the image quality of a document stored in the archive in the printer controller (in the editable format or the immediate print format) can be improved as instructed from the computer and the result can be stored in the archive as a new document (in the editable format or the immediate print format) and can be printed.

The invention can also be embodied in a similar manner in the following case:

(1) The case where the computer and the printer controller in FIGS. 2 and 3 are connected by a Web application connection system rather than the client-server connection system. The Web application connection system is a system of providing a user interface screen on a Web browser in the computer by installing an HTTP server program and a CGI (Common Gateway Interface) program in the printer controller. The user interface screens in FIGS. 9 to 14 are designed for use with both the client-server connection system and the Web application connection system.

According to the invention, a more advanced document system rather than a simple printer can be provided for the user, so that the ease of use of the user can be improved drastically.

What is claimed is:

1. A print system, comprising:
   a computer; and
   a printer connected via a network to said computer, said printer comprising:

an archive for storing documents prepared by said computer; and a page/document layout section for performing page/document layout processing for each stored document and for outputting document data undergoing page/document layout as an immediate print dot image format document.

2. The print system as claimed in claim 1, wherein:

a user selects a document and a job ticket for specifying the page/document layout specification from said computer;

said user selects and specifies print, storage, or storage and print from said computer as an output destination at the same time; and said printer executes page/document layout and print, storage, or storage and print as specified by the user.

3. The system of claim 2, wherein if an input job ticket matches some job ticket for the immediate print format document of the document name, the immediate print format document is used, and otherwise editable format document of the document name is expanded and entered into page/document layout section, and page/document layout section executes page/document layout.

4. The system of claim 3, wherein said page/document layout section performs one of 1 up, 2 up, 4 up, saddle stitch, twining, double speed, and dual page print page/document layout for each stored document.

5. The system of claim 3, wherein at least one of said stored documents comprises a page description language document.

6. The system of claim 5, wherein said page description language document comprises a document in one of PostScript, PDF, PCL-5, PCL-5E, PCL-6, and PCL-XL page description languages.

7. The system of claim 5, wherein said printer further comprises a drawing section that converts said page description language document into dot image data.

8. The system of claim 7, wherein said page/document layout section performs page/document layout processing on said dot image data.

9. The system of claim 3, wherein said printer further comprises:

a spool; and a spool control service section that accepts print jobs and registration in the spool, executes print jobs stored in the spool in the acceptance order, and executes requests from a spool control instruction section in the computer.

10. The system of claim 3, wherein said printer further comprises an archive management service section that accepts and processes requests for at least one of registration, storage, print, storage and print, reference, deletion, name change, display, edit, move, copy, and retrieve.

11. The system of claim 3, wherein said page/document layout section comprises:

a decompressor that decompresses a stored document into a dot image data format;

a page/document layout unit that receives a document in a dot image data format, performs page/document layout processing on said received dot image data format document and outputs a page/document layout processed dot image format document as said immediate print dot image format document; and a compressor that receives and compresses said page/document layout processed dot image format from said page/document layout unit.

12. The system of claim 11, wherein said printer further comprises a drawing section that converts said page description language document into dot image data, and that provides said converted document to said page/document layout unit.

13. The system of claim 11, wherein said printer further comprises a drawing section, said dot image data output from said drawing section is transmitted to a second compressor, said second compressor compresses said dot image data into a compressed document, and said compressed document is transmitted to said page/document layout section.

14. The system of claim 3, wherein each document stored in said archive includes an edit attribute and a print attribute, wherein said edit attribute comprises one of an editable attribute and an edited attribute, and wherein said print attribute comprises one of a printable attribute and a fast printable attribute.

15. The system of claim 14, wherein said printable attribute indicates that a corresponding stored document comprises a document in a page description language, and said fast printable attribute indicates that a corresponding stored document comprises a document in an immediate print dot image format document.

16. The system of claim 3, wherein said printer further comprises a document format converter that converts a stored document into a display/edit format.

17. The system of claim 16, wherein said document format converter comprises:

a page description language format converter that converts a stored document into a display/edit format; and an image format converter that decompresses a document in a dot format.

18. The system of claim 3, wherein said printer further comprises:

a file transfer receiver that receives a document from said computer; and a storage holder that stores said document received from said file transfer receiver.

19. A printer, comprising:

an archive that stores documents prepared by a computer; and a page/document layout section that performs page/document layout processing on at least one document stored in said archive to generate an immediate print dot image format document.

20. A printer, comprising:

means for storing documents prepared by a computer; and means for performing page/document layout processing on at least one document stored in said means for storing documents to generate an immediate print dot image format document.

* * * * *